(12) United States Patent
Salvestro

(10) Patent No.: US 8,330,783 B2
(45) Date of Patent: Dec. 11, 2012

(54) IMAGING PATTERNS OF FEATURES WITH SKEWED EDGES

(75) Inventor: Aldo Salvestro, Burnaby (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 318 days.

(21) Appl. No.: 12/864,517

(22) PCT Filed: Jan. 30, 2008

(86) PCT No.: PCT/IB2008/000209
§ 371 (c)(1),
(2), (4) Date: Jul. 26, 2010

(87) PCT Pub. No.: WO2009/095728
PCT Pub. Date: Aug. 6, 2009

(65) Prior Publication Data
US 2010/0309273 A1    Dec. 9, 2010

(51) Int. Cl.
B41J 2/447 (2006.01)
B41J 2/455 (2006.01)
(52) U.S. Cl. ........................................................ 347/233
(58) Field of Classification Search .................. 347/224, 347/225, 233, 237, 243, 247
See application file for complete search history.

(56) References Cited

U.S. PATENT DOCUMENTS

| | | | |
|---|---|---|---|
| 5,389,959 A * | 2/1995 | Haas | 347/187 |
| 5,517,359 A | 5/1996 | Gelbart | |
| 5,808,655 A * | 9/1998 | Haas et al. | 347/234 |
| 6,682,862 B1 | 1/2004 | Chang et al. | |
| 6,957,773 B2 | 10/2005 | Gelbart | |
| 7,291,365 B2 * | 11/2007 | Kay et al. | 427/596 |
| 2002/0159008 A1 | 10/2002 | Yoshino et al. | |
| 2005/0175909 A1 * | 8/2005 | Caspar et al. | 430/7 |
| 2006/0102853 A1 | 5/2006 | Heinitz et al. | |
| 2007/0070267 A1 | 3/2007 | Yang | |
| 2007/0115555 A1 | 5/2007 | Nellissen | |
| 2010/0084541 A1 * | 4/2010 | Peregrym | 250/202 |
| 2010/0302340 A1 * | 12/2010 | Salvestro | 347/225 |
| 2010/0309280 A1 * | 12/2010 | Peregrym | 347/246 |
| 2011/0316955 A1 * | 12/2011 | Peregrym | 347/198 |

FOREIGN PATENT DOCUMENTS
EP        754 553 A2     1/1997

* cited by examiner

Primary Examiner — Huan Tran
(74) Attorney, Agent, or Firm — Nelson Adrian Blish

(57) ABSTRACT

A method is provided for forming an image of a pattern of features on media which includes determining a pitch of the features along first and second directions and determining a first size of a first pixel based at least on the pitch of the features along the first direction. A second size of a second pixel is determined based at least on the pitch of the features along the second direction. An offset is determined along the scan direction between a first and second scan-line of pixels, based at least on the skew angle and the first size. The imaging head is controlled to form the first pixel comprising the determined first size and the second pixel comprising the determined second size. The imaging head is controlled to form the first scan-line and the second scan-line, offset from one another by the determined offset.

38 Claims, 19 Drawing Sheets

IMAGING PATTERNS OF FEATURES WITH SKEWED EDGES

CROSS REFERENCE TO RELATED APPLICATIONS

This is a U.S. National Stage application under 35 U.S.C. 371 of International Application No. PCT/IB2008/000209, filed Jan. 30, 2008.

TECHNICAL FIELD

The invention relates to imaging systems and to methods for forming patterns of features that have edges that are skewed relative to a desired scanning direction. The invention may be applied to fabricating color filters for electronic displays, for example.

BACKGROUND

Color filters used in display panels typically include a pattern comprising a plurality of color features. The color features may include patterns of red, green and/or blue color features, for example. Color filters may be made with color features of other colors. The color features may be arranged in any of various suitable configurations. Prior art "stripe" configurations have alternating columns of red, green and blue color features as shown in FIG. 1A.

FIG. 1A shows a portion of a prior art "stripe" configuration color filter 10 having a plurality of red, green and blue color features 12, 14 and 16 respectively formed in alternating columns across a receiver element 18. Color features 12, 14 and 16 are outlined by portions of a color filter matrix 20 (also referred to as matrix 20). The columns can be imaged in elongated stripes that are subdivided by matrix cells 31 (also referred to as cells 31) into individual color features 12, 14 and 16. TFT transistors on the associated LCD panel (not shown) may be masked by areas 22 of matrix 20.

Various imaging methods are known in the art and can be used to form various features on media. For example, laser-induced thermal transfer processes have been proposed for use in the fabrication of displays, and in particular color filters. In some manufacturing techniques, when laser-induced thermal transfer processes are used to produce a color filter, a color filter substrate also known as a receiver element is overlaid with a donor element that is then image-wise exposed to selectively transfer a colorant from the donor element to the receiver element. Preferred exposure methods use radiation beams such as laser beams to induce the transfer of the colorant to the receiver element. Diode lasers are particularly preferred for their low cost and small size.

Laser induced "thermal transfer" processes include: laser-induced "dye transfer" processes, laser-induced "melt transfer" processes, laser-induced "ablation transfer" processes, and laser-induced "mass transfer" processes. Colorants transferred during laser-induced thermal transfer processes include suitable dye-based or pigment-based compositions. Additional elements such as one or more binders may be transferred.

Some conventional laser imaging systems produce a limited number of radiation beams. Other conventional systems reduce the time required to complete images by producing many radiation beams with numerous individually-modulated imaging channels. Imaging heads with large numbers of such "channels" are available. For example, a SQUAREspot® model thermal imaging head manufactured by Kodak Graphic Communications Canada Company, British Columbia, Canada has several hundred independent channels. Each channel can have power in excess of 25 mW. An array of imaging channels can be controlled to write an image in a series of image swaths which are arranged to form a continuous image.

Radiation beams are scanned along a scan path to form various images. The visual quality of a formed image can be an important consideration in the selection of a particular imaging process. In applications such laser-induced thermal transfer of color filter features, the quality of the formed color filter is dependant on imaging features that have substantially the same visual characteristics. For example, one particular visual characteristic can include density (e.g. optical density or color density). Density variations among the imaged color features can lead to objectionable image artifacts. Image artifacts can include banding or color variations in imaged features.

The stripe configuration shown in FIG. 1A illustrates one example configuration of color filter features. Color filters may have other configurations. Mosaic configurations have the color features that alternate in both directions (e.g. along columns and rows) such that each color feature resembles an "island". Delta configurations (not-shown) have groups of red, green and blue color features arranged in a triangular relationship to each other. Mosaic and delta configurations are examples of "island" configurations. FIG. 1B shows a portion of a prior art color filter 10 arranged in a mosaic configuration in which color features 12, 14 and 16 are arranged in columns and alternate both across and along the columns.

Other color filter configurations are also known in the art. Whereas the illustrated examples described above show patterns of rectangular shaped color filter elements, other patterns including other shaped features are also known.

FIG. 1C shows a portion of a prior art color filter 10 with a configuration of triangular shaped color features 12A, 14A and 16A. As illustrated in FIG. 1C, each of the respective color features are arranged along columns and are aligned with matrix 20.

FIG. 1D shows a portion of a prior art color filter 10 with a configuration of triangular shaped color features 12A, 14A and 16A. As illustrated in FIG. 1D, each of the respective color features alternate along the columns and rows of color filter 10. As shown in FIGS. 1C and 1D, color features 12A, 14A and 16A can have different orientations within a given row or column.

FIG. 1E shows a portion of a prior art color filter 10 that includes a configuration of chevron shaped color features 12B, 14B and 16B. As illustrated in FIG. 1E, each of the respective color features are arranged along columns and are aligned with matrix 20. Color features 12B, 14B and 16B are formed from stripes that bend from side to side and are outlined by portions of a color filter matrix 20.

FIG. 1F shows a portion of a prior art color filter 10 that includes a configuration of chevron shaped color features 12B, 14B and 16B. As illustrated in FIG. 1F, each of the respective color features alternate along the columns and rows of color filter 10.

The shape and configuration of a color filter feature can be selected to provide desired color filter attributes such as a better color mix or enhanced viewing angles. Features with edges that are skewed relative to a desired imaging scan direction can create additional challenges with respect to their fabrication.

In some applications, it is required that the features be formed in substantial alignment with a registration region provided on media. For example, in FIG. 1A the various color features 12, 14 and 16 are to be aligned with a pattern of matrix cells 34 that are provided by matrix 20. Color features 12, 14 and 16 can overlap matrix 20 to reduce backlight leakage effects. In some applications such as color filters, the visual quality of the final product can be dependant upon the accuracy with which a pattern of features (e.g. a pattern of color filter features) is aligned with a pattern of registration sub-regions (e.g. a color filter matrix). Misalignment can lead to the formation of undesired colorless voids or to the overlapping of adjacent features which can result in an undesired color characteristic.

While overlapping a matrix 20 can help to reduce the accuracy with which the color features must be registered with matrix 20 in color filter applications, there are typically limits to the extent that matrix 20 can be overlapped. Factors that can limit the degree of overlap (and final alignment) can include, but are not limited to: the particular configuration of the color filter, the width of the matrix lines, the roughness of the matrix lines, the overlap required for preventing backlight leakage, and post annealing shrinkage.

Factors associated with the particular method employed to form the features can limit the degree of overlap. For example, when laser imaging methods are employed, the accuracy with which the laser imager can scan the color filter will have a bearing on the final registration obtained. There is a desire in the display industry to employ color filter matrixes with thinner line widths. This desire can further complicate the alignment requirements.

The imaging resolution with which the features can be imaged also has a bearing on the final alignment. The imaging resolution is related to a size characteristic of an image pixel formed by a corresponding radiation beam during an imaging process. Higher resolutions can be used to form pixels with smaller dimensions. Smaller pixels may be combined to more precisely form imaged features. Higher resolutions however are not always possible however. For example, a radiation beam can be emitted to cause a radiation spot to be scanned across media to form a pixel thereupon. The size pixel in the scan direction is related to the size of the spot along the scan direction and the speed with which it is scanned along the scan direction. The size of the spot itself limits the imaging resolution that can be achieved along the scan direction. The size of the spot can be related to the switching frequency with which the radiation beam is emitted. Limits on the switching frequencies can therefore limit imaging resolution. Higher imaging resolution can also be limited by the imaged media itself. Exposure characteristics of the media can limit the size of the pixels that are formed. For example, in some thermal transfer processes, a radiation beam of suitable intensity is required to cause a region of image forming material to separate from a donor element and transfer to a receiver element. The transfer mechanism associated with the media can limit the use of high resolution pixels. However, forming features with relatively large pixels may limit the alignment that is achieved between the features and the registration regions they are to be aligned with. There remains a need for effective and practical imaging methods and systems that lead to the formation of high-quality images of patterns of features. Various portions of these features can have different orientations relative to a desired scanning direction. Various edges of these features can be skewed relative to a direction of a scan path.

There remains a need for effective and practical imaging methods and systems that can form features in substantial alignment with a pattern of registration sub-regions provided on media. Various edges of these features can be skewed relative to a direction of the scan path. The features can be part of a color display.

There remains a need for effective and practical imaging methods and systems that can form features with imaging resolutions that are relatively coarse in comparison with the size of the features themselves or with a desired tolerance required by a desired alignment of the features with a pattern of registration sub-regions provided on media. Various edges of these features can be skewed relative to a direction of the scan path. The features can be part of a color display.

There remains a need for effective and practical imaging methods and systems that can form color features in alignment with color filter matrix lines that have reduced line widths.

SUMMARY OF THE INVENTION

The present invention relates to a method for forming an image on a media while the media is moved relative to a radiation beam. The media can include a pattern of registration subregions, such as, for example, a matrix. The image can include one or more patterns of features, such as color features for a color filter or colored illumination sources as part of an organic light emitting diode display. The one or more patterns of features can be aligned with the pattern of registration sub-regions. The features could be island features wherein each feature of a first plurality of features of a first color is separated from each other feature of the first color by a feature of a different color. The features can be stripes which may or may not be interrupted in one or more directions. The edges of the features can be skewed with respect to an arrangement direction of imaging channels of an imaging head. The features could be chevron shaped.

The images can be formed by a laser-induced thermal transfer process such as a laser-induced dye-transfer process, a laser induced mass transfer process or by other means of transferring material from a donor element to a receiver element.

In one example embodiment of the present invention an image of a pattern of features is formed on media with radiation beams emitted by an imaging head while scanning over the media along a scan direction. The features in the pattern can be regularly arranged along a first direction and along a second direction that intersects the first direction. The second direction can be parallel to the scan direction. The pattern includes a feature which can repeat along the first and second directions. The feature can have a first edge portion that extends along a direction that is skewed by a skew angle relative to the scan direction. The feature could have an axis of symmetry that extends along a direction that is parallel to the scan direction, and could be in the shape of a chevron.

The method includes determining a pitch of the features along the first direction and determining a first size of a first pixel to be formed on the media based at least on the pitch of the features along the first direction. The first size is along a direction that intersects the scan direction. The pitch of the features may be equal to an integer multiple of the first size. The pitch of the features along the second direction is determined. A second size, along the scan direction, of a second pixel to be formed on the media is determined based at least on the pitch of the features along the second direction. The first and second sizes can be the sizes of edges of the pixels, or other portions of the pixels. The pitch of the features along the second direction may be equal to an integer multiple of the second size. An offset is determined along the scan direction between a second scan-line of pixels to be formed on the media and a first scan-line of pixels to be formed on the media, the offset is based at least on the skew angle and the first size. The imaging head is controlled to emit the radiation beams to form the image on the media while scanning along the scan direction. The imaging head is controlled to form the first pixel of the determined first size and the second pixel of the determined second size while scanning over the media. The imaging head is controlled to form the first scan-line of pixels and the second scan-line of pixels while scanning over the media. The second scan-line of pixels is offset from the first scan-line of pixels by the determined offset.

In one example embodiment, the first scan-line of pixels comprises the first pixel and the second scan-line of pixels comprises the second pixel. Each of the first scan-line of pixels and the second scan-line of pixels may or may not comprise the same sized pixels. In some embodiments, the first scan-line of pixels is offset from the second scan-line of pixels along the scan direction by an amount that is smaller than the second size. In other embodiments, the first scan-line of pixels is offset from the second line of pixels along the scan direction by an amount that is larger than the second size.

In one embodiment, the offset along the scan direction can be determined based at least on the relationship: Offset= $(T*X)/\operatorname{Tan}(\theta)$, where: Offset is the offset along the scan direction; X is the first size; T is an integer greater than or equal to 1; and $\theta$ is an angle corresponding to the skew angle.

The feature can include a second edge portion that extends along a direction that is parallel to the direction that the first edge portion extends along. The second edge portion and the first edge portion can be offset from one another along the scan direction.

In one embodiment, each feature in the pattern comprises an edge portion that extends along a direction that is parallel to the direction that the first edge portion extends along, and each of the edge portions are regularly arranged along the scan direction.

In another embodiment each feature in the pattern comprises a set of edge portions. Each of the edge portions in each set extends along a direction that is parallel to the direction that the first edge portion extends along, and each edge portion in each set is offset along the scan direction from other edge portions in the set.

The second scan line of pixels can be offset from the first scan-line of pixels with the determined offset by delaying the activation of an imaging channel of the imaging head. The duration of time with which a radiation beam is emitted can be controlled to form a pixel on the media with a size along the scan direction equal to the second size.

The length of time during which a channel of a light valve of the imaging head is turned on and off can be controlled and varied to form a pixel with a size along the scan direction equal to the second size. The imaging head can be controlled to emit a radiation beam to form a radiation spot on the media by rotating the imaging head or by positioning the radiation spot at an angle about an axis that intersects a surface of the media over which the radiation beam is scanned to form a pixel on the media with a cross-scan size that is equal to the first size. Alternatively, the radiation spot can be magnified or de-magnified to form a pixel on the media with a cross-scan size equal to the first size.

In another embodiment, an image including a plurality of features is formed on media with radiation beams emitted by an imaging head while scanning over the media along a scan direction. The plurality of features could include a pattern of features where each of the features is regularly arranged along the scan direction and along a direction that intersects the scan direction. Each of the features could repeat along the scan direction and along the direction that intersects the scan direction. The imaging head is controlled to emit the radiation beams to form the plurality of features on the media with an orientation in which a plurality of edges of each feature are skewed by a skew angle relative to the scan direction and each of the plurality of edges are parallel to one another and offset from one another along the scan direction. The imaging head is controlled to form a first scan-line of pixels while scanning over the media. The imaging head is controlled to form a second scan-line of pixels while scanning over the media. The second scan-line of pixels is offset along the scan direction from the first scan-line of pixels by an offset distance determined based at least on the skew angle, and each of the first scan-line of pixels and the second scan-line of pixels intersects each of the plurality of edges of each feature while not intersecting other edges of each feature. The other edges of each feature extend along directions that are different than the direction that each edge of the plurality of edges extends along.

Pixels of the first scan-line of pixels have a first size along a cross-scan direction. Each of the features could be regularly arranged along the cross scan direction, and the pitch of the features along a cross scan direction could be equal to an integer multiple of the first size. The method could include determining the offset distance based at least on the first size. The first scan-line of pixels and the second scan-line of pixels could be adjacent to one another.

A program product carrying a set of computer-readable signals could be used to carry out the above methods.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1A:
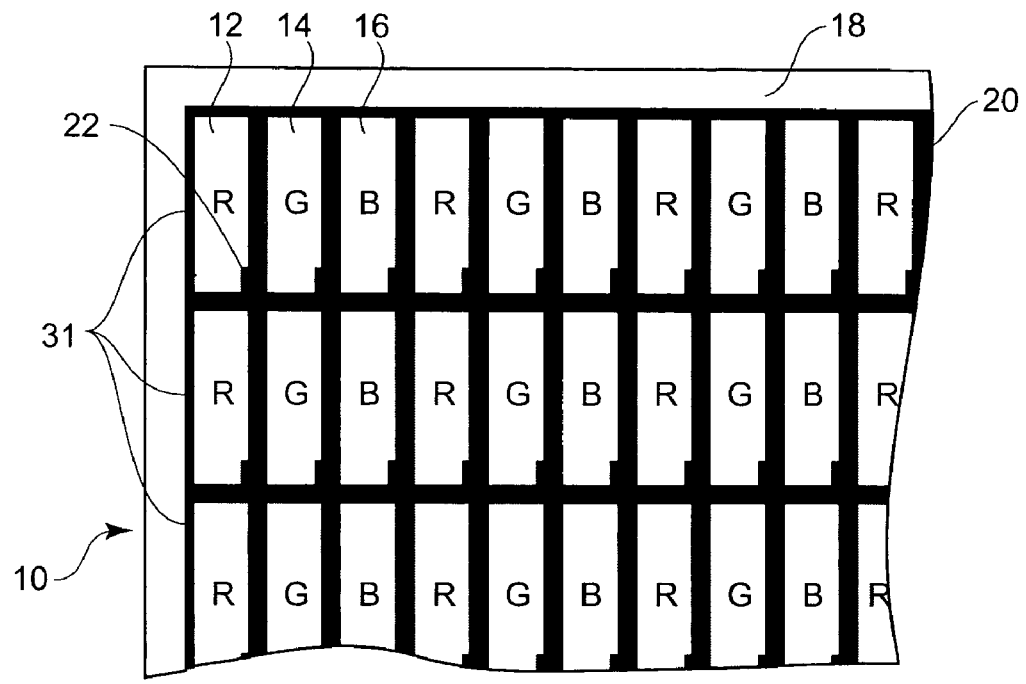
FIG. 1A is a plan view of a portion of a prior art color filter.
Figure 1B:
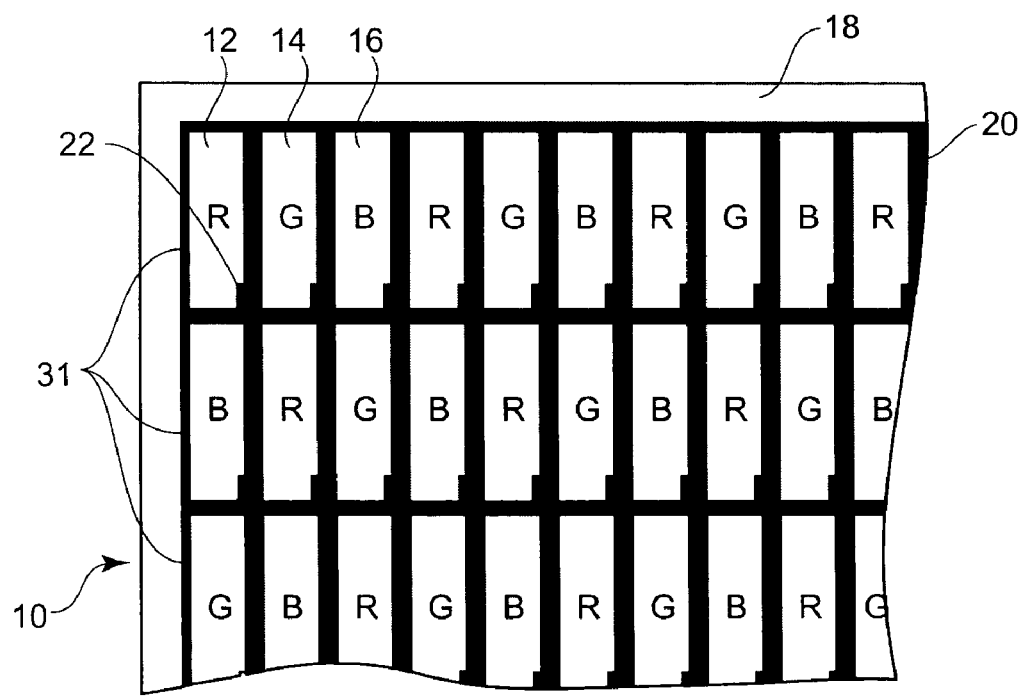
FIG. 1B is a plan view of a portion of another prior art color filter.
Figure 1C:
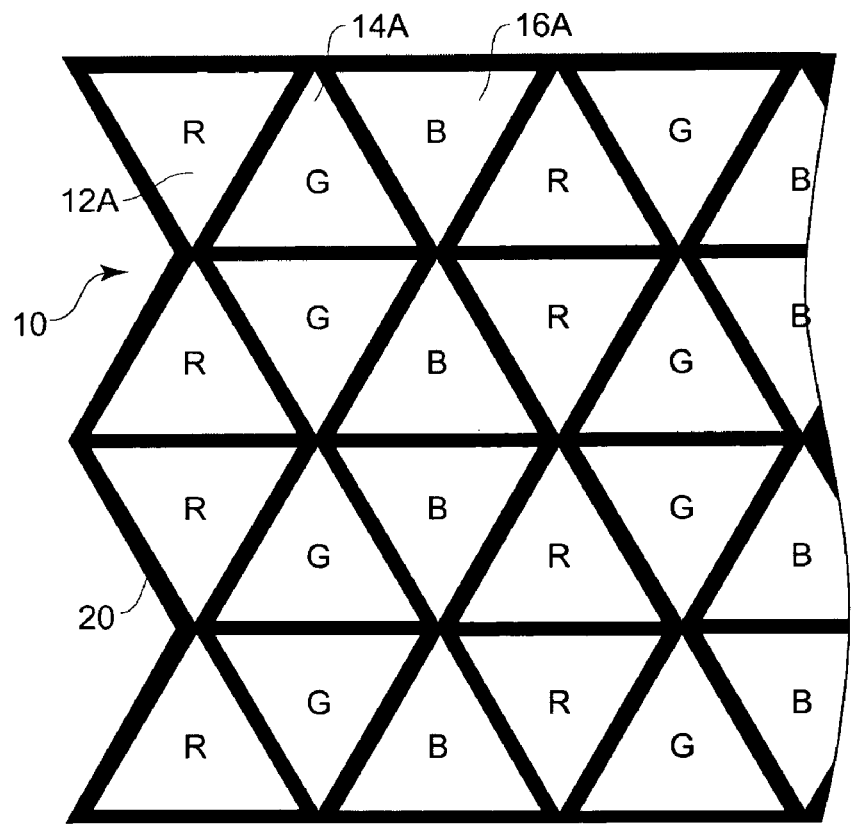
FIG. 1C is a plan view of a portion of a prior art filter including triangular shaped features.
Figure 1D:
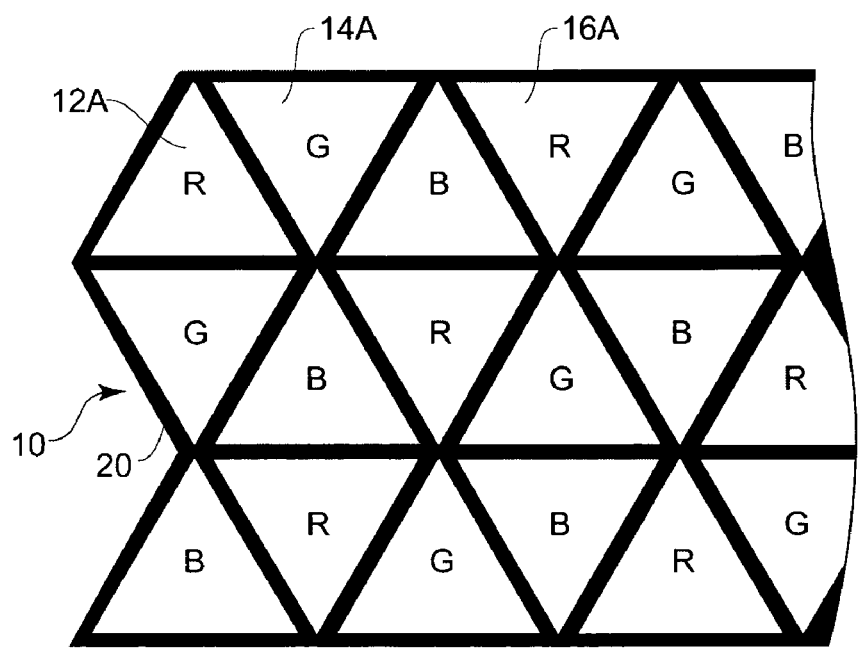
FIG. 1D is a plan view of a portion of another prior art filter including triangular shaped features.
Figure 2A:
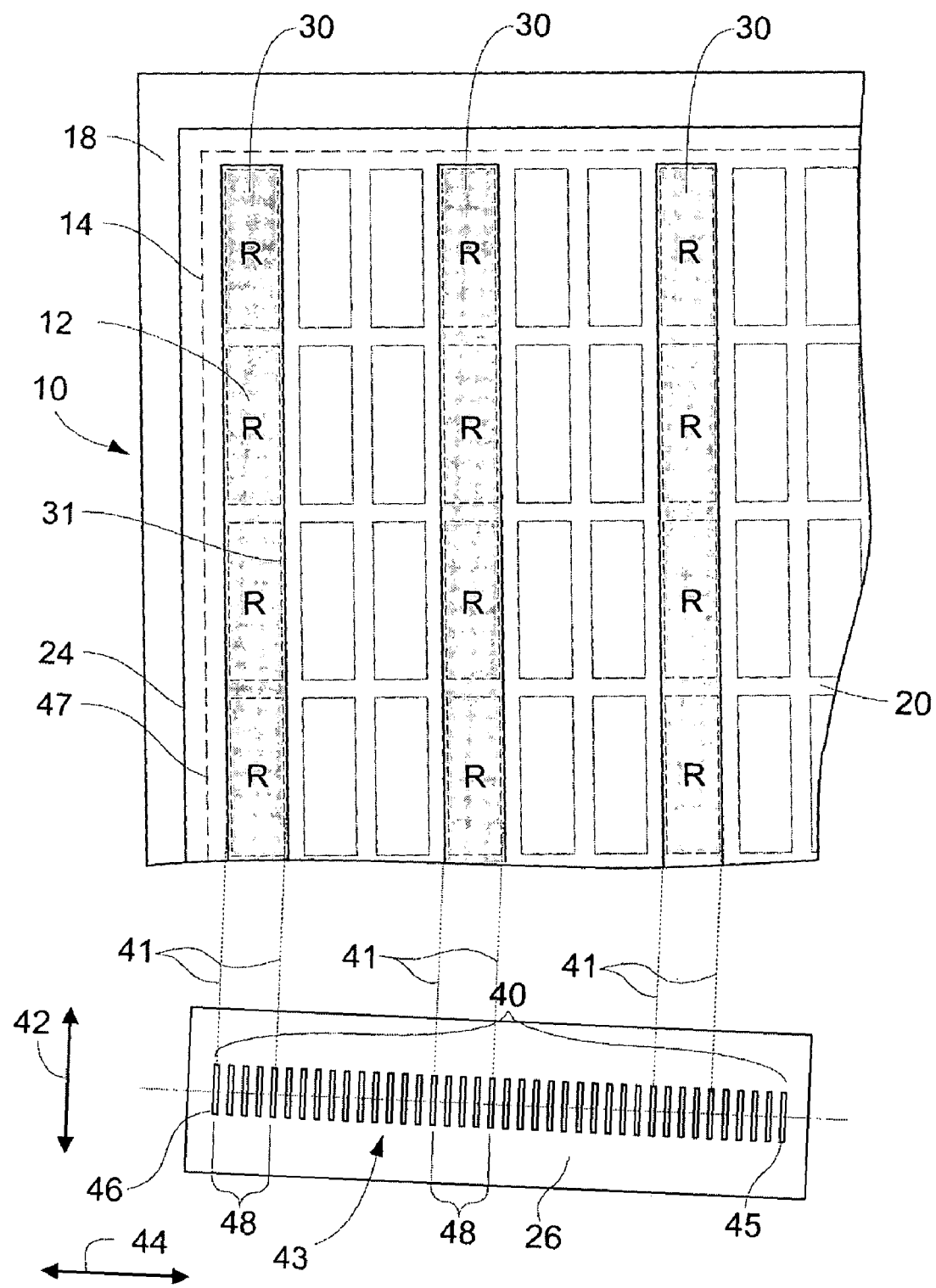
FIG. 2A is a schematic representation of a multi-channel head imaging a pattern of features onto imagable media in a conventional thermal transfer process.

FIG. 2A schematically shows a conventional laser-induced thermal transfer process being used to fabricate a stripe configuration color filter 10 similar to that shown in FIG. 1A. In this case the imaging of red stripe features 30 is shown. Red stripe features 30 are lightly shaded for clarity. An imaging head 26 is provided to transfer image-forming material (not shown) from a donor element 24 to an underlying receiver element 18. Donor element 24 is shown as being smaller than receiver element 18 for the purposes of clarity only. Donor element 24 may overlap one or more portions of receiver element 18 as may be required. Imaging head 26 can include an arrangement of several imaging channels. In this case, imaging head includes a channel array 43 of individually addressable channels 40.

Receiver element 18 can include a registration region with which it is desired to form images of one or more features in substantial alignment. Receiver element 18 can include a pattern of registration sub-regions with which it is desired to form images of one or more features in substantial alignment. Receiver element 18 includes a registration region 47 (schematically represented in large broken lines). In this case, registration region 47 includes a color filter matrix 20. Matrix 20 is an example of a pattern of registration sub-regions. Although a laser-induced thermal transfer process could be used to form matrix 20 on receiver element 18, matrix 20 is typically formed by lithographic techniques.

Image-forming material can be image-wise transferred onto the receiver element 18 when radiation beams emitted by imaging head 26 are scanned across donor element 24. Red, green and blue portions of filter 10 are typically imaged in separate imaging steps; each imaging step involving replacing the preceding color donor element with the next color donor element to be imaged. Each of the red, green and blue features of the filter is to be transferred to receiver element 18 in substantial alignment with a corresponding matrix cell 31. After the color features have been transferred, the imaged color filter may be subjected to one or more additional process steps, such as an annealing step, for example, to change one or more physical properties (e.g. hardness) of the imaged color features.

Figure 3:
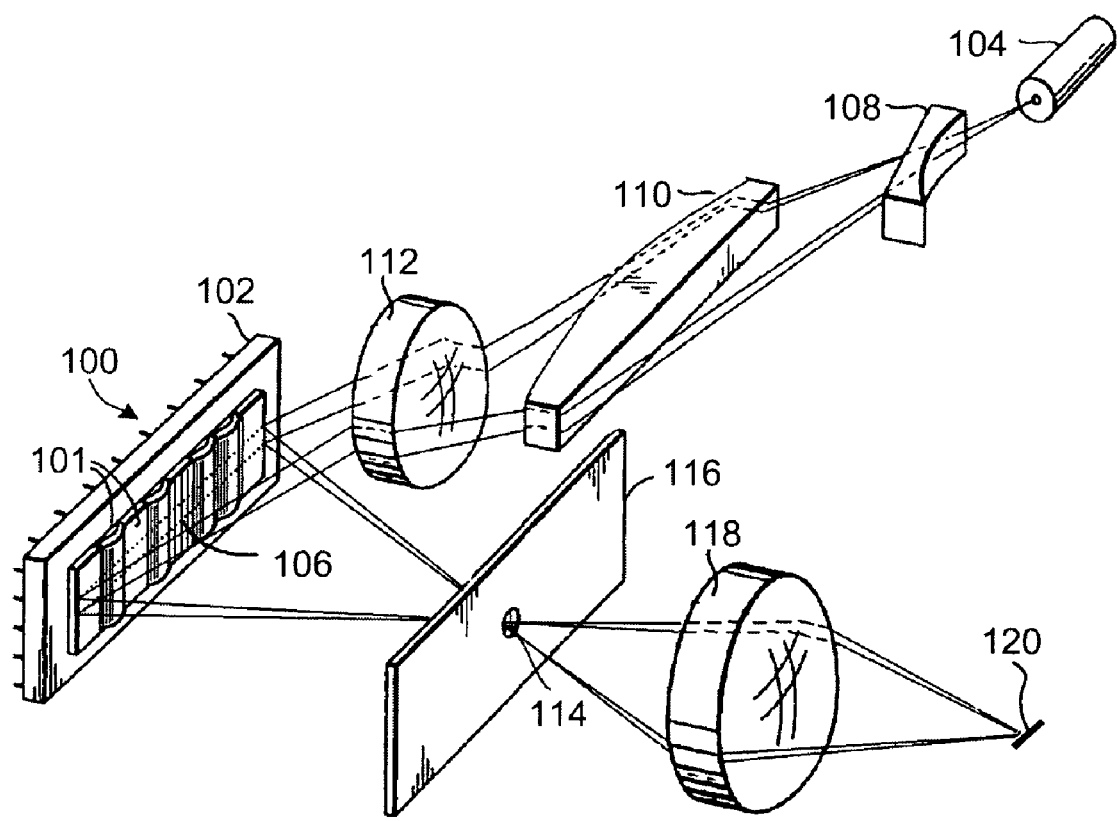
FIG. 3 is a schematic perspective view of the optical system of an example prior art multi-channel imaging head.

An example of an illumination system employed by a conventional laser-based multi-channel imaging process is schematically shown in FIG. 3. A spatial light modulator or light valve is used to create a plurality of imaging channels. In the illustrated example, linear light valve array 100 includes a plurality of deformable mirror elements 101 fabricated on a semi-conductor substrate 102. Mirror elements 101 are individually addressable. Mirror elements 101 can be micro-electro-mechanical (MEMS) elements, such as deformable mirror micro-elements, for example. A laser 104 can generate an illumination line 106 on light valve 100 using an anamorphic beam expander comprising cylindrical lenses 108 and 110. Illumination line 106 is laterally spread across the plurality of elements 101 so that each of the mirror elements 101 is illuminated by a portion of illumination line 106. U.S. Pat. No. 5,517,359 to Gelbart describes a method for forming an illumination line.

A lens 112 typically focuses laser illumination through an aperture 114 in an aperture stop 116 when elements 101 are in their un-actuated state. Light from actuated elements is blocked by aperture stop 116. A lens 118 images light valve 100 to form a plurality of individual image-wise modulated beams 120, which can be scanned over the area of a substrate to form an imaged swath. Each of the beams is controlled by one of the elements 101. Each element 101 corresponds to an imaging channel of a multi-channel imaging head.

Each of the beams is operable for imaging, or not imaging, an "image pixel" on the imaged receiver element in accordance with the driven state of the corresponding element 101. That is, when required to image a pixel in accordance with the image data, a given element 101 is driven to produce a corresponding radiation beam with an intensity magnitude and duration suitable for forming a pixel image on the substrate. When required not to image a pixel in accordance with the image data, a given element 101 is driven to not produce a radiation beam. As used herein, pixel refers to a single unit element of image on the substrate, as distinguished from the usage of the word pixel in connection with a portion of an image displayed on an assembled display device. For example, if the present invention is used to create a filter for a color display, the pixels created by the present invention will be combined with adjacent pixels, to form a single pixel (also referred to as a feature) of an image displayed on the display device.

FIG. 2A depicts the correspondence between imaging channels 40 and the transferred pattern as broken lines 41. Features, such as stripe features 30 generally have sizes that are greater than a width of a pixel imaged by an imaging channel 40. The radiation beams generated by imaging head 26 are scanned over receiver element 18 while being image-wise modulated according to image data specifying the pattern of features to be written. Groups 48 of channels are driven to produce radiation beams wherever it is desired to form a feature. Channels 40 not corresponding to the features are driven so as not to image corresponding areas. Accordingly, a radiation beam is emitted every time an imaging channel is turned on. Thus, as an imaging channel is turned on and off, each time the channel is turned on, a new radiation beam is emitted from that channel.

Receiver element 18, imaging head 26, or a combination of both, are moved relative to one another while imaging channels 40 are controlled in response to image data to create images. In some cases, imaging head 26 is stationary and receiver element 18 is moved. In other cases, receiver element 18 is stationary and imaging head 26 is moved. In still other cases, both the imaging head 26 and the receiver element 18 are moved.

Imaging channels 40 can be activated to form an image swath during a scan of imaging head 26. Receiver element 18 can be too large to be imaged within a single image swath. Therefore, multiple scans of imaging head 26 are typically required to complete an image on receiver element 18.

Movement of imaging head 26 along sub-scan axis 44 may occur after the imaging of each swath is completed along main-scan axis 42. Alternatively, with a drum-type imager, it may be possible to relatively move imaging head 26 along both the main-scan axis 42 and sub-scan axis 44, thus writing the image swath extending helically on the drum. In FIG. 2A, relative motion between imaging head 26 and receiver element 18 is provided along a path aligned with main-scan axis 42 and along a path aligned with sub-scan axis 44.

Any suitable mechanism may be applied to move imaging head 26 relative to receiver element 18. Flat bed imagers are typically used for imaging receiver elements 18 that are relatively rigid, as is common in fabricating display panels. A flat bed imager has a support that secures a receiver element 18 in a flat orientation. U.S. Pat. No. 6,957,773 to Gelbart describes a high-speed flatbed imager suitable for display panel imaging. Alternatively, flexible receiver elements 18 can be secured to either an external or internal surface of a "drum-type" support to affect the imaging of the image swaths.

In FIG. 2A, matrix 20 is skewed with respect to main-scan axis 42 and sub-scan axis 44. Matrix 20 is skewed with respect to an arrangement direction of imaging channels 40. In this case, stripe features 30 are required to be formed in a skewed manner to be correctly aligned with matrix 20. Skewed features or features with skewed edges have been conventionally imaged by establishing controlled relative motion between receiver element 18 and imaging head 26 as radiation beams are directed along scan paths. In this case, sub-scan motion is coordinated with main-scan motion in accordance with the degree of skew. As main-scan motion is provided between imaging head 26 and receiver element 18, synchronous sub-scan motion between the two is also provided to create a motion referred to as "coordinated motion". Unlike drum-based imaging methods where image swaths are imaged in a helical fashion in which the amount of sub-scan motion during each drum rotation is typically defined independently of the image to be formed, the amount of sub-scan motion during each scan is dependant on the image to be formed when coordinated motion techniques are employed. Coordinated motion can be used to form features with edges that are substantially smooth and continuous which in some demanding applications can be used to facilitate an alignment of a pattern of features with a pattern of registration sub-regions. As shown in FIG. 2A, portions of each stripe feature 30 overlap various lines of matrix 20.

Figure 1E:
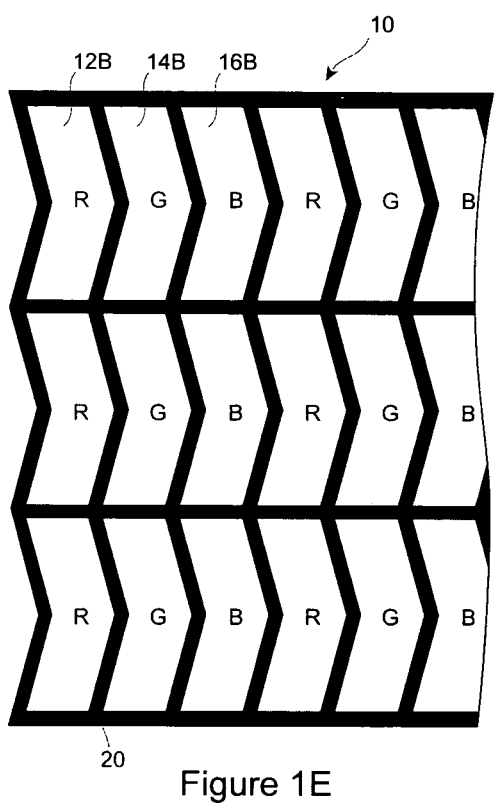
FIG. 1E is a plan view of a portion of a prior art filter including chevron shaped features.
Figure 1F:
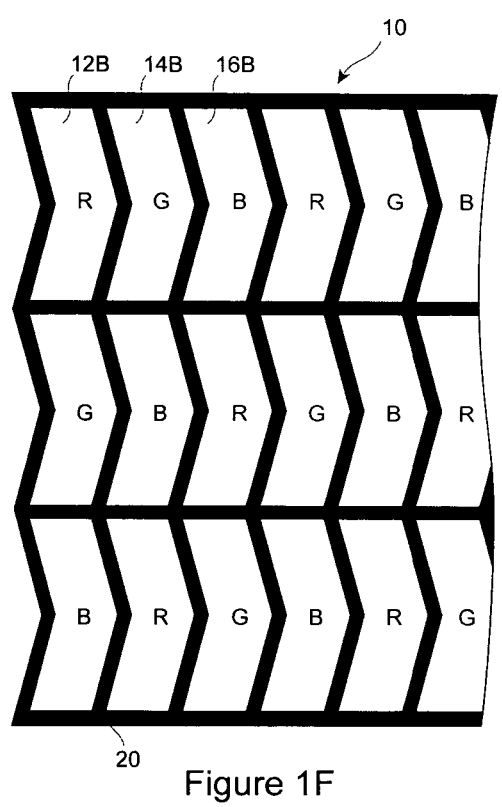
FIG. 1F is a plan view of a portion of another prior art filter including chevron shaped features.
Figure 2B:
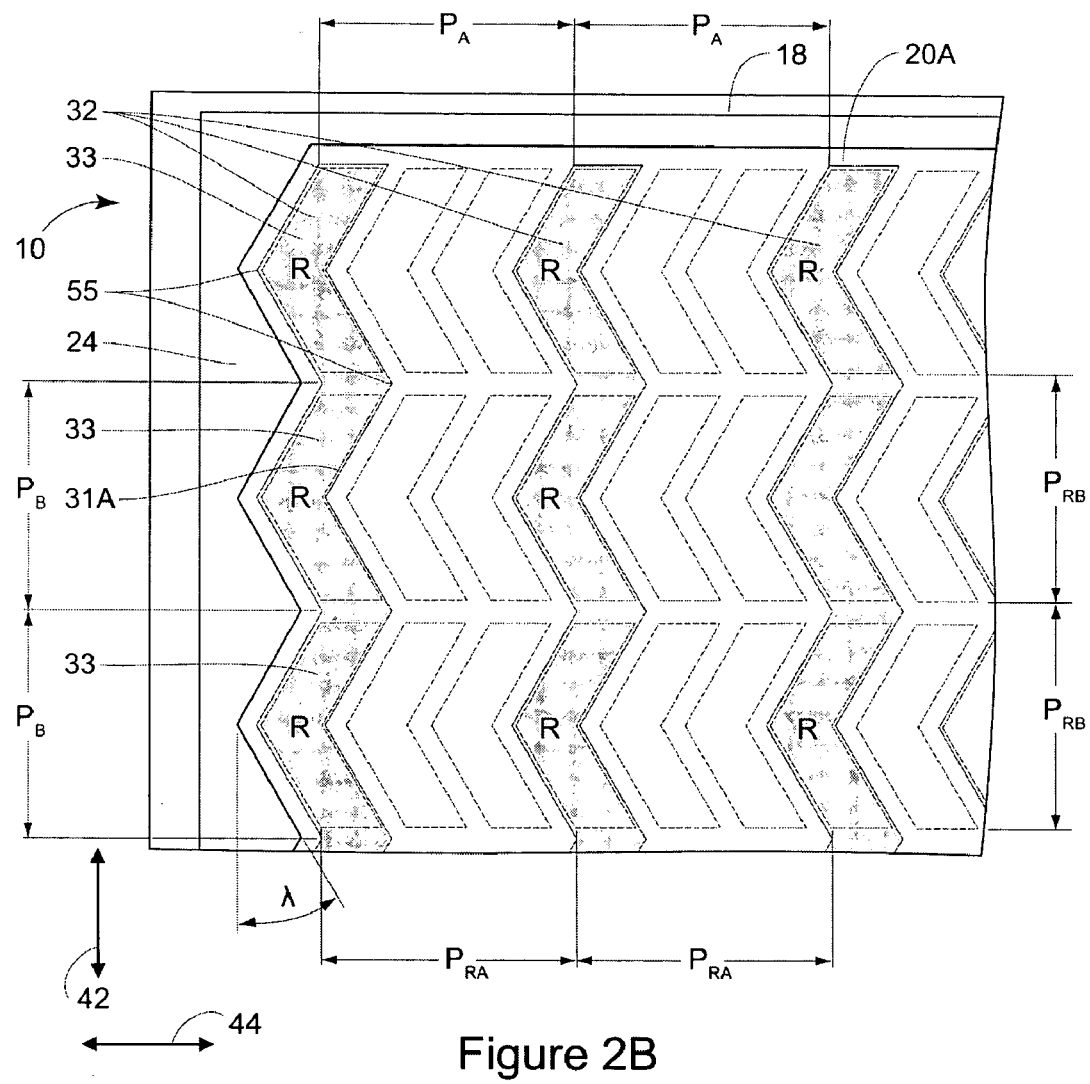
FIG. 2B is a plan view of a portion of "stripe configuration" color filter in which the color stripes bend from side to side.

FIG. 2B schematically shows a stripe configuration color filter 10 similar to that shown in FIG. 1E. In this case, it is desired that red (R) stripe features 32 include various portions that are skewed with respect to an arrangement direction of imaging channels of an imaging head 26 (not shown) that is used to form stripe features 32. Desired stripe features 32 are shaded for clarity. It is desired that imaging head 26 be controlled to image donor element 24 to transfer an image forming material to receiver element 18 to form "zigzag" like stripe features 32. In this case, the stripes bend from side to side as they extend in a direction parallel to the scan direction. Color filter features 33 comprising a chevron shape are defined by each matrix cell 31A of matrix 20A in areas corresponding to the transferred stripe features 32. In this case various features 33 are contiguous with respect to one another. In some cases, the stripe features can be interrupted and the resulting features 33 are non-contiguous.

Although it is possible to form stripe features 32 by employing conventional coordinated motion techniques, these techniques can reduce the productivity of the imaging process. Coordinated motion techniques used during the imaging of features such as the zigzag stripe features 32 would require a reciprocating form of motion. For example, as imaging head 26 is moved relative to receiver element 18 along a path aligned with main-scan axis 42, imaging head 26 would need to synchronously reciprocate with respect to receiver element 18 along a path aligned sub-scan axis 44 to follow the zigzag shaped features. The movement mechanism used to establish the required main-scan and sub-scan relative motions would need to deal with high deceleration and accelerations that would be required to move about the various corners (e.g. corners 55) of each stripe feature 32. The following equations can be use to illustrate this:

$$V_{subscan} = V_{mainscan} * \tan \lambda, \text{ where:} \quad (1)$$

$V_{subscan}$ is the relative sub-scan speed of the coordinated motion, $V_{mainscan}$ is the relative main-scan speed of the coordinated motion, and $\lambda$ is an angle corresponding to the degree of inclination of the feature portions as measured with respect to main-scan axis 42;

$$t = V_{subscan}/A_{subscan}, \text{ where:} \quad (2)$$

t is the time required to reduce $V_{subscan}$ to zero at a point (e.g. corner 55) about which the sub-scan motion is reciprocated, and $A_{subscan}$ is the deceleration required to establish change between $V_{subscan}$ and a zero speed at the reciprocation point, and $$d = V_{mainscan} * t, \text{ where:} \quad (3)$$

d is the distance traveled in the main-scan direction during time t.

By recombining equations (1), (2) and (3), distance d can be expressed as:

$$d = (V_{mainscan}^2 * \tan \lambda)/A_{subscan}. \quad (4)$$

For typical conditions of: $V_{mainscan}$=1 m/sec, $A_{subscan}$=5 m/sec$^2$ and an angle $\lambda$=30 degrees, a distance d=115.5 mm would be required to reach a reciprocation point. For some demanding applications involving features comprising "inclined" feature portions, reciprocated coordinated motion would not practical. For example, in color filter applications, chevron shaped color features can include inclined portions that are a hundred microns or so in length. A deceleration distance "d" measured in millimeters would not be suitable for the imaging of such small features.

Other methods that can be employed to image skewed features or features with skewed edges include approximating the formed edges with "stair-case" arrangements of pixels. Unlike imaging methods employing coordinated motion techniques, these techniques can result in the formation of features with edges that are not smooth, but rather, jagged or stair-case in appearance. Imaging head 26 can be controlled to form a two dimensional grid of image pixels (not shown in FIG. 2B) on receiver element 18. Skewed feature edges are imaged approximately by stair-case arrangements of the pixels whose placement is governed by the grid.

Aligning a pattern of features with a pattern of registration sub-regions can create challenges for the imaging process employed to form the features with arrangements of pixels. Features can be arranged in different patterns. In some patterns, the features are regularly arranged along one or more directions. In such patterns, each feature includes a common reference, and the features are arranged such that each of the common references are separated from one another by an equal distance along an arrangement direction of the pattern of features. This equal distance is referred to as "pitch". Common references can include a feature edge, a feature corner, a feature center point, etc.

FIG. 2B shows an example of a desired alignment of a pattern of features with a registration region that includes a pattern of registration sub-regions. In this example, cells 31A (some of which are partially shown in small broken lines) are regularly arranged along a first direction that is parallel to main-scan axis 42 and along a second direction that is parallel to sub-scan axis 44. In this case, it is desired that stripe features 32 (and corresponding color features 33) be formed in substantial alignment with matrix 20A to form a "stripe configuration" color filter comprising chevron shaped color features. Each of the stripe features 32 is to be delineated by cells 31A to form a plurality of red (R) color filter features 33. Accordingly, it is desired that the pitch "$P_A$" of the pattern of resulting color features 33 substantially equal the pitch "$P_{RA}$" of the pattern of corresponding cells 31A along the first direction. Accordingly, it is desired that the pitch "$P_B$" of the pattern of resulting color features substantially equal the pitch "$P_{RB}$" of the pattern of corresponding cells 31A along the second direction. In this case, the first direction is substantially parallel to a cross-scan direction associated with the desired imaging and the second direction is substantially parallel to a scan direction associated with the desired imaging. It is understood that other features of other colors (not shown for clarity) as may be required by color filter 10 may also be governed by similar alignment requirements.

Figure 2C:
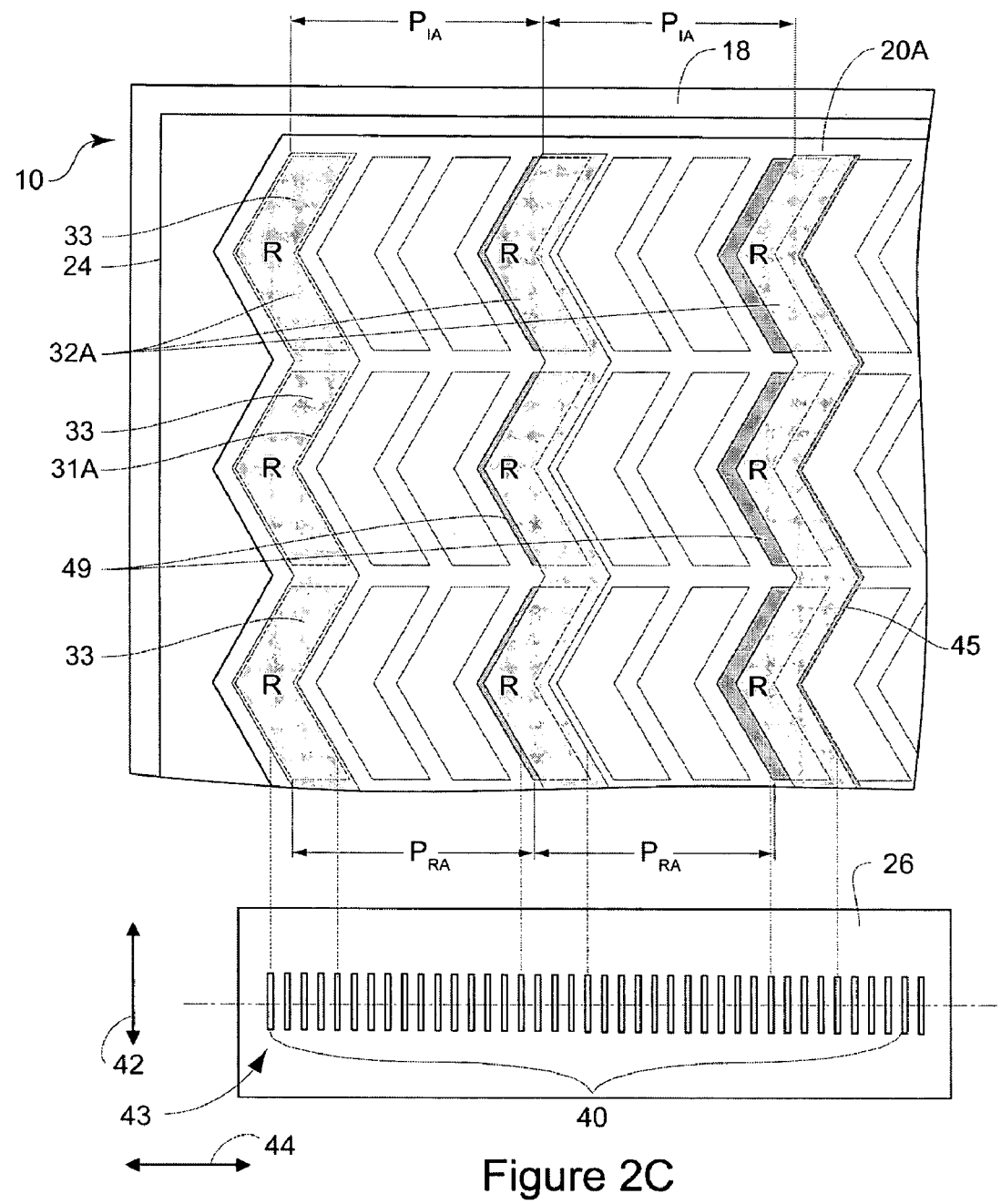
FIG. 2C schematically shows a laser-induced thermal transfer process being used to fabricate the color filter of FIG. 2B with an incorrect cross-scan resolution.

FIG. 2C schematically shows an imaging process that forms imaged stripe features 32A in an attempt to image desired stripe features 32 in correct alignment with cells 31A as required by FIG. 2B. Imaging head 26 includes a channel array 43 of individually addressable channels 40 that are uniformly sized and which repeat along an arrangement direction of the array. In this case, the arrangement direction is parallel to sub-scan axis 44. Each of the channels can emit radiation beams that form image pixels (not shown) having a first size along a cross-scan direction (i.e. parallel to sub-scan axis 44 in this case) and a second size along a scan direction (i.e. parallel to main-scan axis in this case).

FIG. 2C schematically shows the difficulties of imaging the pattern of features shown in with this first pixel size along the cross-scan direction. Proper registration requires that the red stripe features 32A be formed with a pitch that matches the pitch $P_{RA}$ of the cells 31A. FIG. 2C shows that this requirement is not met. Essentially, the first-cross scan resolution of the imaging channels 40 cause imaged stripe features 32A to be formed with an initial pitch $P_{IA}$ that is not equal to $P_{RA}$.

Typically, the ability to control the size and position of each of the imaged stripe features 32A is a function of pixel size. The radiation beams generated by imaging head 26 each create a pixel size along the cross-scan direction that cannot form the imaged pattern of imaged stripe features 32A with a pitch that matches the desired pattern of stripe features 32. Although the resolution of the imaging channels 40 may, or may not cause each of the images stripe features 32A to be imaged with a size along a cross-scan direction that is equal the corresponding size of desired red stripe features 32, the resolution is such that the desired pitch cannot be matched.

As shown in FIG. 2C, some of the imaged stripe features 32A are offset from corresponding cells 31A by varying amounts. In this case some of the offsets have increased to a point in which one of the stripe features 32A would be overlapped by other features imaged with other color donor elements in region 45 of matrix 20A. Also, in regions 49, some matrix cells 31A have not been completely covered with a red stripe feature 32A leading to a potential for a color-less void. Both these effects can lead to undesired visual characteristics in the final color filter. It becomes apparent that these effects can be additionally compounded as arrangements of larger number of imaging channels 40 are employed to enhance imaging productivity. Regions 45 and 49 are shaded for clarity.

Figure 4A:
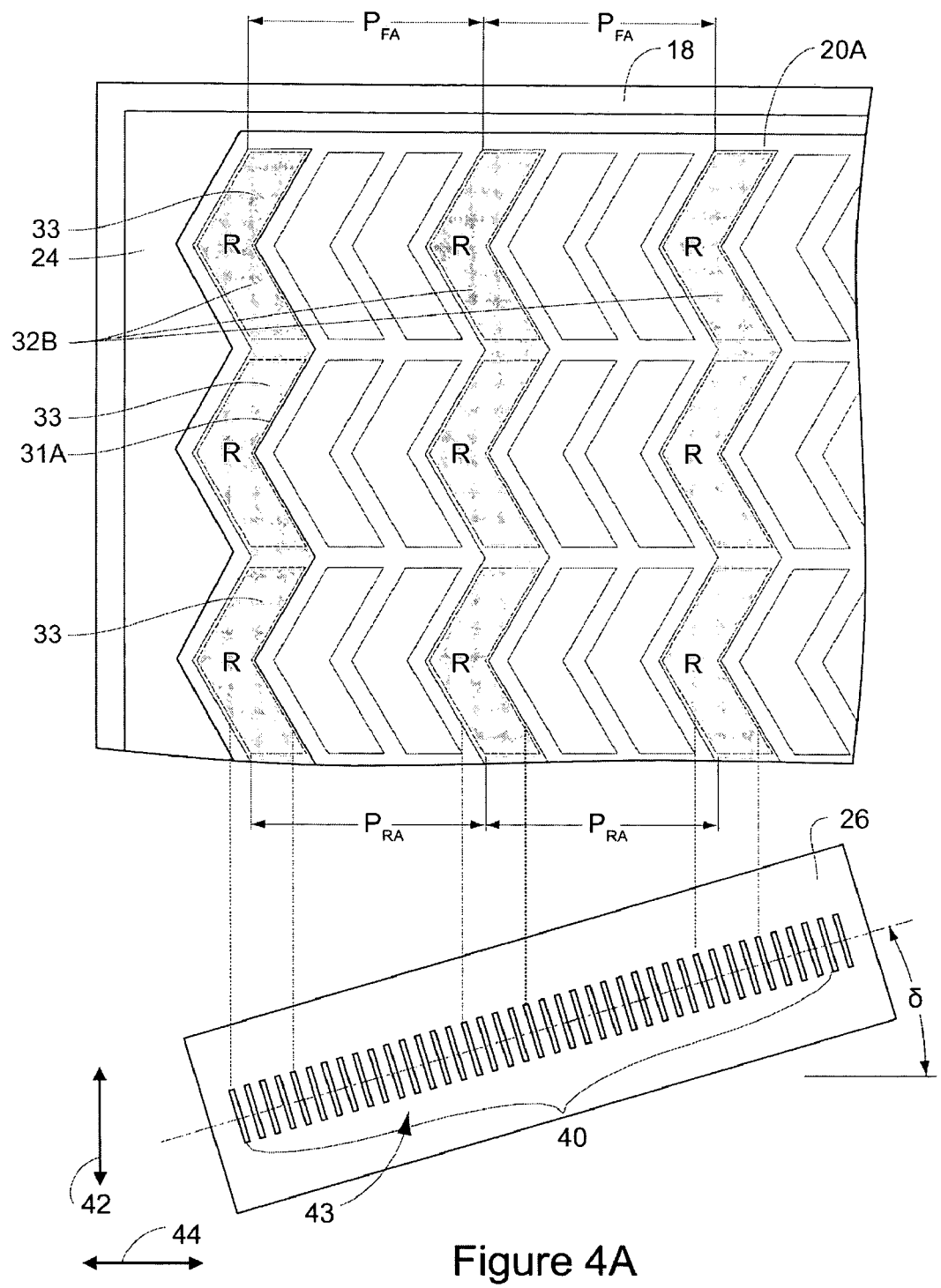
FIG. 4A schematically shows an imaging of the color filter of FIG. 2B as per an example embodiment of the invention.

FIG. 4A schematically shows an imaging of the desired pattern of features shown in FIG. 2B as per an example embodiment of the invention. Red stripe features 32B are imaged with the same imaging head 26 shown in the imaging process shown in FIG. 2C. In accordance with this example embodiment of the invention, imaging head 26 is rotated by an angle δ about an axis intersecting a plane of receiver element 18 over which radiation beams are scanned. Angle δ is shown as measured between sub-scan axis 44 and an arrangement direction of imaging channels 40. Angle δ is selected so that the imaging resolution of the rotated imaging head 26 is appropriately sized to cause the imaged pattern of red stripe features 32B be image with a pitch $P_{FA}$ that is substantially equal to the pitch $P_{RA}$ of cells 31A. Rotation of imaging head 26 causes a cross-scan size of the imaged pixels (again, not shown) to change. The resulting size of the imaged pixels may, or may not cause imaged red stripe features 32B to be formed with cross-scan sizes that are equal to the corresponding cross-scan sizes of the desired stripe features 32A shown in FIG. 2B. However, by adjusting the pixels to a size appropriate for the required cross-scan pitch, many of the previously described artifacts that would arise from mismatched pitches are substantially avoided.

Although in FIG. 4A, imaging head 26 was rotated by angle δ as referenced from sub-scan axis 44, it is understood that other references could just as easily be used.

Figure 4B:
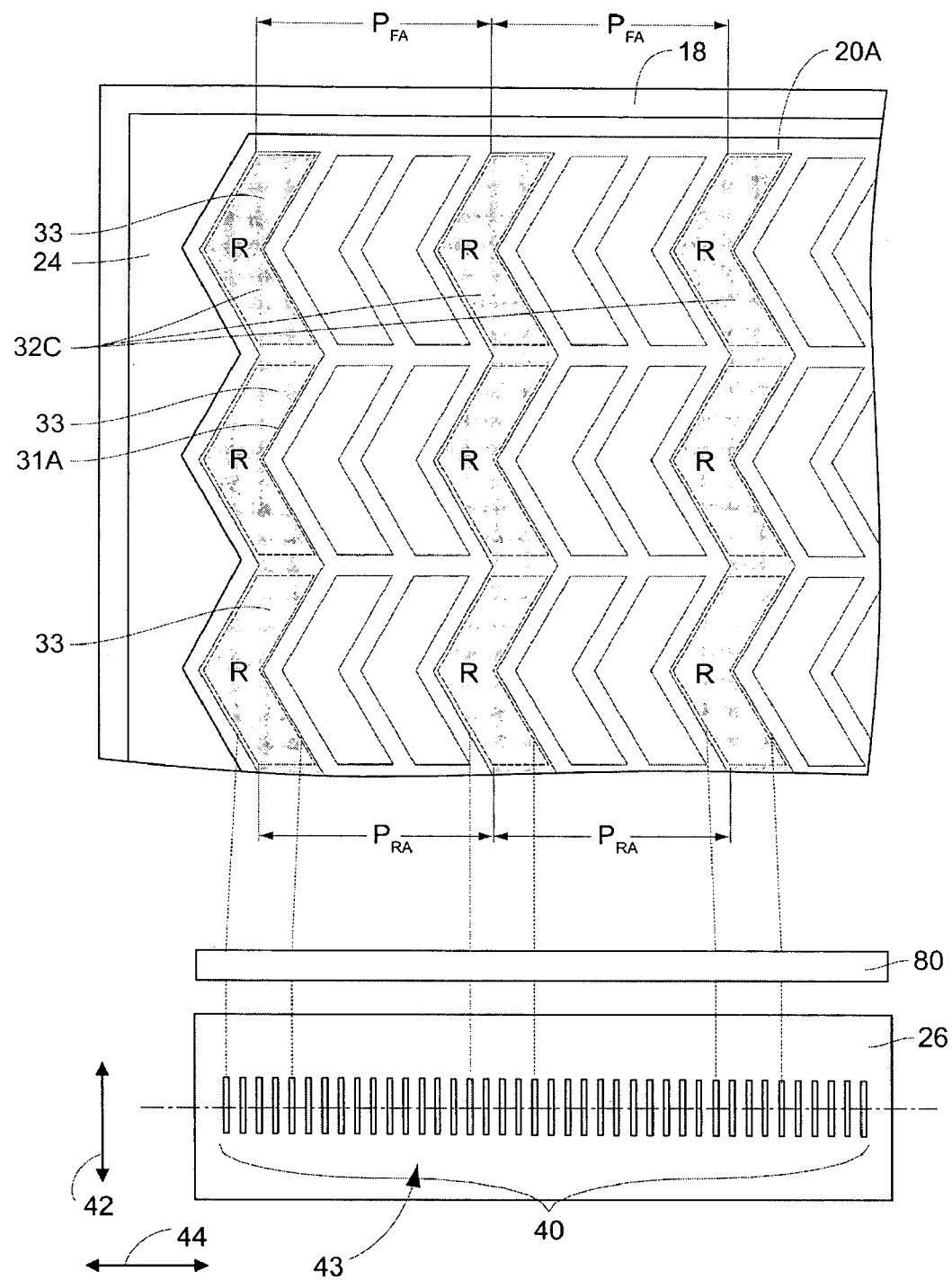
FIG. 4B schematically shows an imaging of the color filter of FIG. 2B as per another example embodiment of the invention.

Other methods can be employed to change a size of an imaged pixel in directions that intersect the scanning direction. FIG. 4B schematically shows the imaging of the desired pattern of features shown in FIG. 2B as per another example embodiment of the invention. As per this aspect of the invention, imaging head 26 includes zoom mechanism 80. Zoom mechanism 80 adjusts a size of the radiation beams emitted by imaging head 26 such that the pattern of imaged red stripe features 32C are imaged with a pitch $P_{FA}$ that is substantially equal to the pitch $P_{RA}$ of cells 31A.

Figure 5:
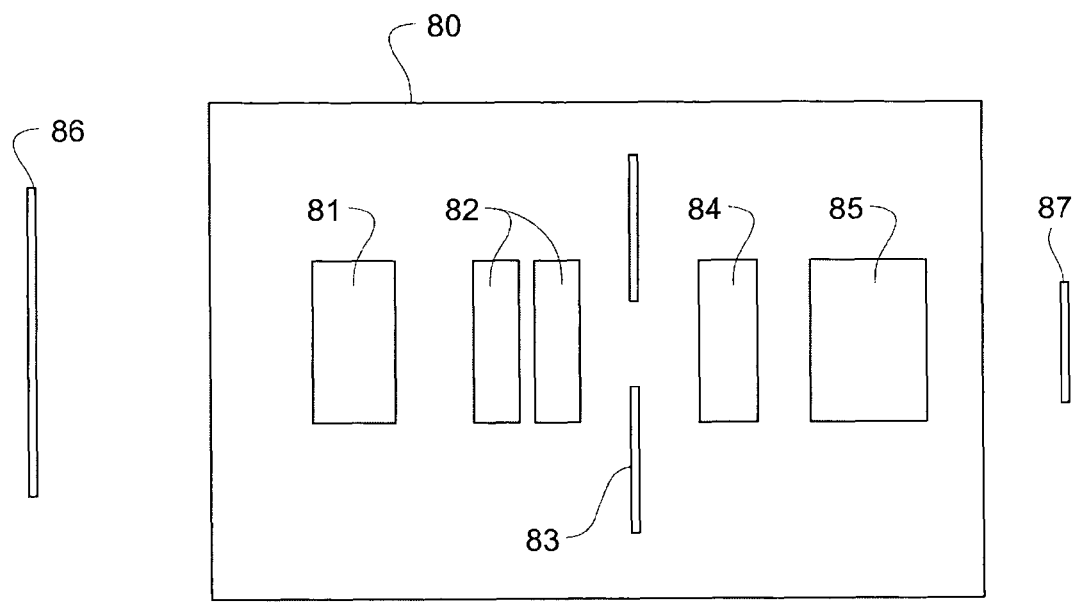
FIG. 5 is a schematic representation of a zoom system employed by an example embodiment of the invention.

FIG. 5 schematically shows a zoom system 80 that can be employed by various embodiments of the invention. Zoom system 80 includes a fixed field optical component 81, two or more movable zoom optical components 82, an aperture stop 83, a fixed optical component 84 and a moveable focus optical component 85. In this example embodiment, aperture stop 83 is located between the zoom optical components 82 and the fixed optical components 84. Zoom mechanism 80 maintains the locations of the object plane 86 and the image plane 87 through the zoom adjustment range. The location of the zoom optical components 82 are moved between various positions to set the magnification of the optical system. Each of the optical components can include one or more lenses. One or more of the optical components can be anamorphic. Other types of zoom mechanisms can also be employed by this invention.

Figure 2D:
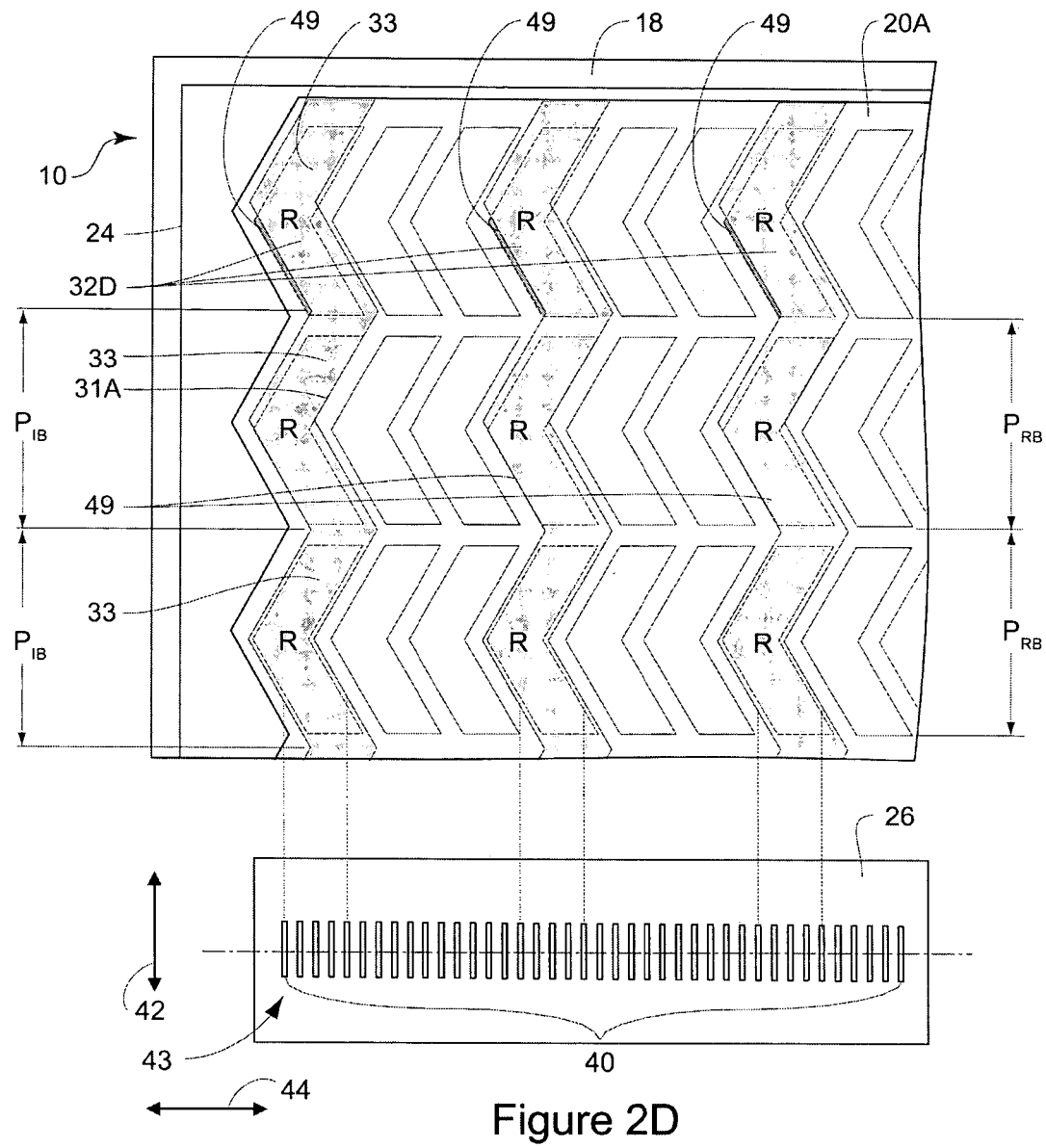
FIG. 2D schematically shows a laser-induced thermal transfer process being used to fabricate the color filter of FIG. 2B with an incorrect scan resolution.

In a similar fashion, the desired stripe features 32A need to be formed with pixels whose sizes along the scan direction are sized to cause the desired pitch of the color filter features 33 along the second direction to be met. FIG. 2D schematically shows the formation of color features 33 with imaged stripe features 32D. In this regard, FIG. 2D schematically shows the difficulties of imaging the pattern of features 33 with a second pixel size along the scan direction that cannot meet this requirement. Essentially, the scan resolution employed causes the color features 33 to be formed with an initial pitch $P_{IB}$ that is not equal to $P_{RB}$.

As shown in FIG. 2D, portions of the imaged red stripe features 32D are offset from corresponding cells 31A by varying amounts. In a similar fashion to that shown in FIG. 2C, these offsets can result in various imaged artifacts such as color-less voids 49 for example. Accordingly, it is required that the resolution of the imaging head be adjusted to match the pitch $P_{RB}$ along the scan direction.

Figure 6:
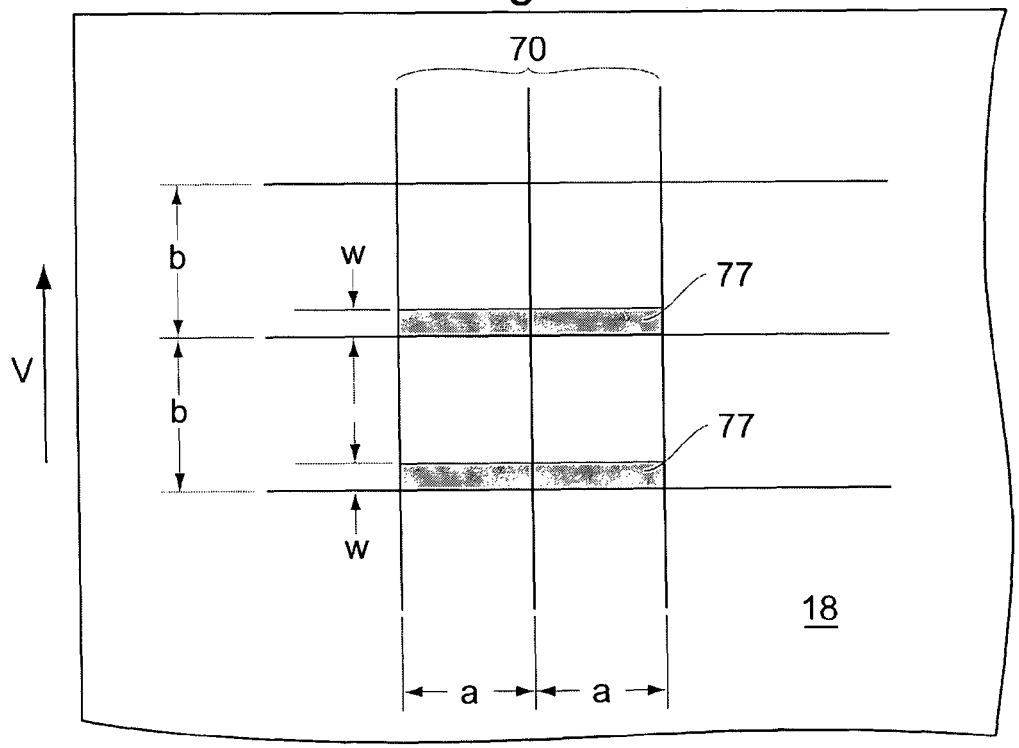
FIG. 6 schematically shows a grid-like arrangement of pixels formed by scanning radiation beams.

Adjusting the scan resolution to form the pixels whose size along the scan direction is adjusted in accordance with a desired image pitch along the scan direction can be accomplished by various techniques. For example, FIG. 6 shows a grid-like arrangement of pixels 70 formed by scanning radiation beams over a receiver element 18. The size of each pixel 70 is characterized by various dimensions along different directions. Each of the pixels 70 has a dimension equal to size "b" along a scan direction associated with the formation of pixels 70 and a dimension equal to size "a" in a cross-scan direction. In this example, a particular size of each pixel 70 is produced by scanning a rectangular radiation spot 77 over the area of each pixel 70. The scanning is achieved as part of the overall scanning of the image. In order to scan spot 77 over the pixel region, a relative motion having a velocity "V" is required. The relative motion can be generated by moving the radiation spot 77, or by moving receiver element 18, or by moving both. In this case, the scan direction is parallel to the direction of the relative movement and the size of the spot in the scan direction is "w". The time that the laser spot dwells over any point of the media is defined by w/V. In this case, the size in the scan direction of each pixel 70 is a function of an initial size of a radiation beam "w" used to form the pixel and the duration of time in which that beam is scanned across receiver element 18. Although the size in the scan direction can be adjusted by varying velocity, this could result in a change in the exposure created by the radiation beam. One method of changing pixel size along the scan direction for a given scanning speed involves adjusting the length of time during which an imaging channel is activated. For example, in some imaging systems that include light valves, a timing signal that includes a pattern of timing pulses is provided to all of the light valve elements and individual elements are activated in accordance with image data. The time between the timing pulses is related to the length of time that each light valve element can be activated or not activated as a function of the image data and consequently defines a size along the scan direction of the pixels formed in accordance with the image data. In this example embodiment of the invention, the time between the timing pulses is controlled to adjust size b in accordance with a desired pitch of the imaged features along the scan direction.

Rectangular radiation spots 77 can be created by various methods, including using rectangular apertures. The spot need not be rectangular however and can include other shapes as desired. In some example embodiments of invention, pixel sizes along the scan direction are varied by adjusting the amount of time that a corresponding imaging channel 40 is activated while scanning radiation beams to form the pixels.

Other example embodiments of the invention can vary pixel size along the scan direction by other methods.

In some example embodiments of the invention, a pixel size along a cross-scan direction is selected such that an imaged pattern of features has a desired feature pitch along a first direction that is an integer multiple of the pixel size along the cross-scan direction. Additionally or alternatively, in some example embodiments of the invention, a pixel size along a scan direction is selected such that an imaged pattern of features has a desired feature pitch along a second direction that is an integer multiple of the pixel size along the scan direction. The first direction can be substantially parallel to the cross-scan direction and the second direction can be substantially parallel to the scan direction.

A required pitch may be determined in various ways. For example, the pitch of a pattern of registration sub-regions (e.g. a pattern of cells in a color filter matrix) can be determined by direct measurement. Various optical sensors can be used to detect the position of various registration sub-regions and the detected positions can be use to determine the pitch between the sub-regions. Sizes of image pixels, radiation beams or the imaged swath itself can also be determined by direct measurement. Various pitches can be determined in different ways.

Other factors can also come into play when trying to form a pattern of features in substantial alignment with a pattern of registration sub-regions. For example, in color filter fabrication, color filter features can be formed such that they overlap portions of the lines of a matrix to help to reduce the accuracy with which the color features must be aligned with the pattern of matrix cells. There are however typically limits to the extent that a matrix can be overlapped. The imaging process itself can have an effect on the degree of overlap that is permitted. For example, the visual quality of an image produced in a laser-induced thermal transfer process is typically sensitive to the uniformity of the interface between the donor element and the receiver element. A non-uniform interface can affect the amount of image forming material that is transferred from the donor element to the receiver element. If adjacent features overlap one another over matrix lines, the uniformity of the donor-to-receiver element interface can be impacted in the overlapped regions as a function of the additional material that has been transferred to these regions. The additional material can adversely impact the visual quality of features that are formed during a subsequent imaging with additional donor elements. In this regard, it is typically preferred that adjacent features not overlap each other over a matrix line. This requirement places additional alignment constraints on the required alignment between the pattern of repeating color features and the repeating pattern of matrix cells.

Figure 7A:
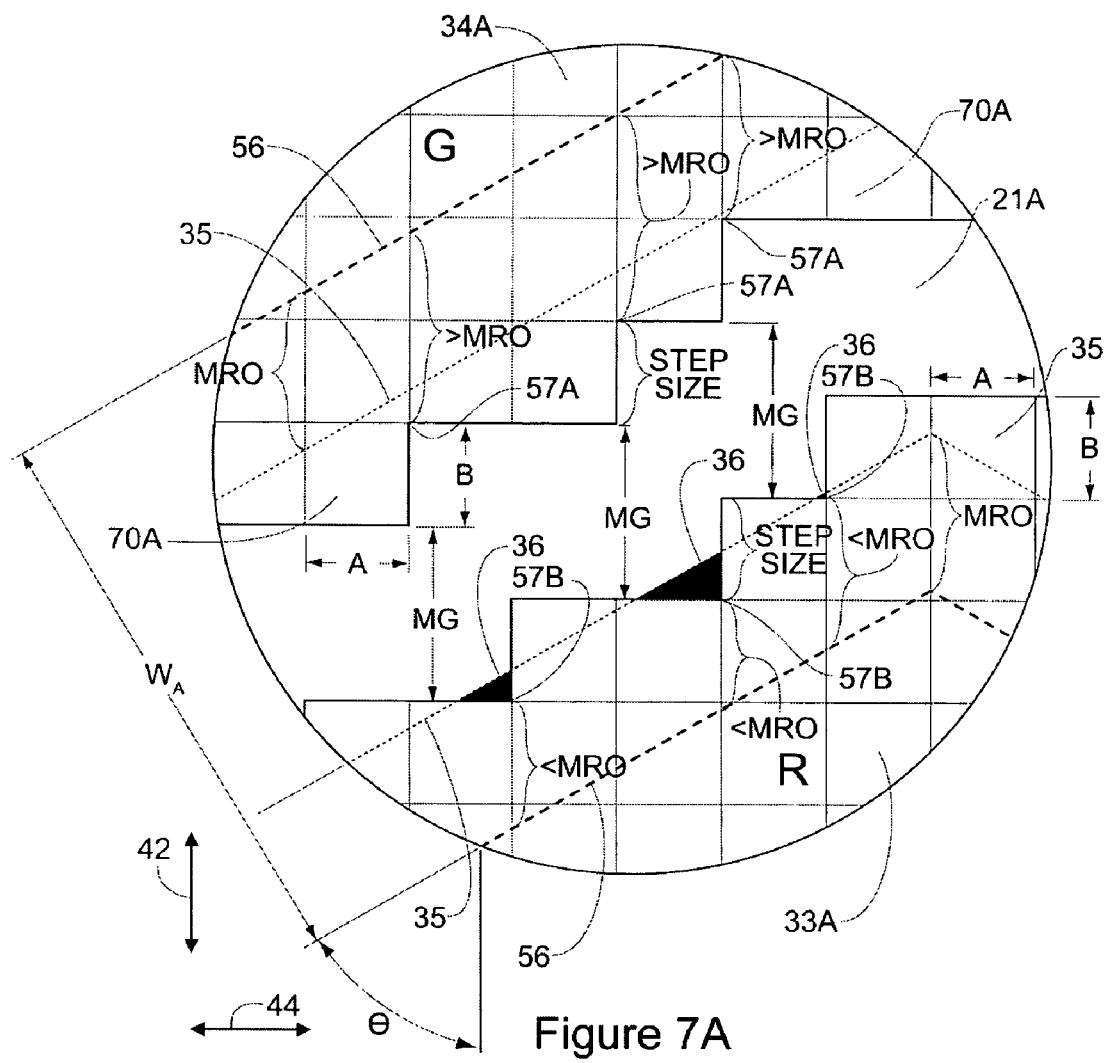
FIG. 7A schematically shows a tolerance budget associated with a formation of a plurality of feature portions on a receiver element that includes a matrix line that extends in a direction that is skewed relative to a scanning direction.

FIG. 7A schematically shows a tolerance budget associated with a formation of a first feature portion 33A and a second feature portion 34A in an overlapped relation with a skewed matrix line 21A whose edges 56 are represented by large broken lines. Overlapped matrix line 21A is shaded for clarity. Edges 56 are skewed by an angular value equal to θ as referenced with a scanning direction which is parallel to main-scan axis 42 in this case. Features portions 33A and 34A are part of different features that have edges that extend along directions that are skewed relative to a desired scanning direction of the imaging system. FIGS. 1C, 1D, 1E and 1F show an example of color filter features that can have various edge portions that could be skewed with respect to a scanning direction of one or more radiation beams used to form the features. In this example, feature portions 33A and 34A are part of a chevron-shaped stripe feature configuration color filter (similar to the color filter shown in FIG. 1E) and feature portion 33A corresponds to a first color (e.g. red) while feature portion 34A corresponds to another color (e.g. green).

Feature portions 33A and 34A were formed with various stair-cased arrangements of pixels 70A. Pixels 70A have a first size A along a cross-scan direction and a second size B along the scan direction. In this case, each of feature portions 33A and 34A belong to corresponding two dimensional regular patterns of color features and the first size A is selected in accordance with a desired pitch $P_A$ of the features along a first direction of the pattern (i.e. each of the corresponding patterns of color features having the same pitch along the first direction). In this case, second size B is selected in accordance with a desired pitch $P_B$ of the features along a second direction of the pattern (i.e. each of the corresponding patterns of color features having the same pitch along the second direction). In this case the first direction is parallel to sub-scan axis 44 while the second direction is parallel to main-scan axis 42.

The illustrated tolerance budget takes into account various factors that can be considered when imaging color filter features such that they are aligned with a matrix line 21A without overlapping one another. For example, each of the features portions 33A and 34A are to be formed such that they overlap matrix line 21A by a certain amount to achieve a desired quality characteristic of the color filter. In this case, each of the feature portions 33A and 34A is required to overlap matrix line 21A by a minimum required overlap (MRO) distance. Distance MRO can be dependent on various factors. One possible factor is the imaging accuracy of the imaging system used to image features portions 33A and 34A. The imaging accuracy can be affected by the mechanical repeatability associated with the positioning of the imaging head (not shown in FIG. 7A) during the imaging process, variations in the radiation beam characteristics and the edge roughness of the resulting images that are formed. Another possible factor is the matrix line repeatability which represents the variation in location of the matrix line 21A with respect to the receiver element 18 upon which it has been formed. Another possible factor includes an absolute minimum required overlap required for various additional issues (e.g. feature shrinkage during an annealing process). Distance MRO can also be dependant on other factors. MRO boundary lines 35 are shown with respect to corresponding overlapped edges 56 of matrix line 21A. In this case the MRO boundary lines 35 are parallel to edges 56.

FIG. 7A shows that each of the feature portions 33A and 34A are separated from one another by a minimum gap MG. Minimum gap MG is budgeted to prevent feature portions 33A and 34A from overlapping each other over matrix line 21A during their formation. Minimum gap MG is typically governed by the imaging repeatability associated with the imaging of each of the feature portions 33A and 34A. The imaging repeatability can be dependant on various factors which can include the mechanical repeatability of the imaging system (e.g. the mechanical repeatability of the media and imaging head positioning system, and beam drift arising form thermal effects and the like).

The tolerance budget shown in FIG. 7A also takes into account the imaging resolution in the scan direction that corresponds to the "step size" that is required to establish the stair-case arrangement of pixels 70A. The stair-case arrangement of pixels creates stepped edges in which each step has a rise (i.e. the rise being aligned with scan direction) which is a function of the imaging resolution along the scan direction. As shown in FIG. 7A, the stair-cased edges of feature portions 33A and 34A are shown in a "nested" relationship with respect to one another to establish feature-to-feature gaps that are equal to the MG requirements.

MRO boundary lines 35 (represented by small broken lines) define the minimum required overlap of each of the feature portions 33A and 34A with respect to each of the matrix line edges 56. As shown in FIG. 7A, the stair-case arrangement of pixels causes various amounts of overlap at various locations. For example, with reference to feature portion 34A the MRO requirements are all substantially met or exceeded at locations 57A. Feature portion 33A does not fully overlap matrix line 21A at locations 57B resulting in the formation of non-overlapped regions 36 (darkened for clarity). These non-overlapped regions can cause visual artifacts in the color filter. As shown in FIG. 7A the width $W_A$ of matrix line 21 is not sufficiently large enough to meet both the MG and MRO requirements and thereby results in undesired non-overlapped regions 36. A possible option for dealing with non-overlapped regions 36 would be to further increase the line width of the matrix line 21A, but this is counter to the industry desire to reduce the matrix line widths in color displays.

Figure 7B:
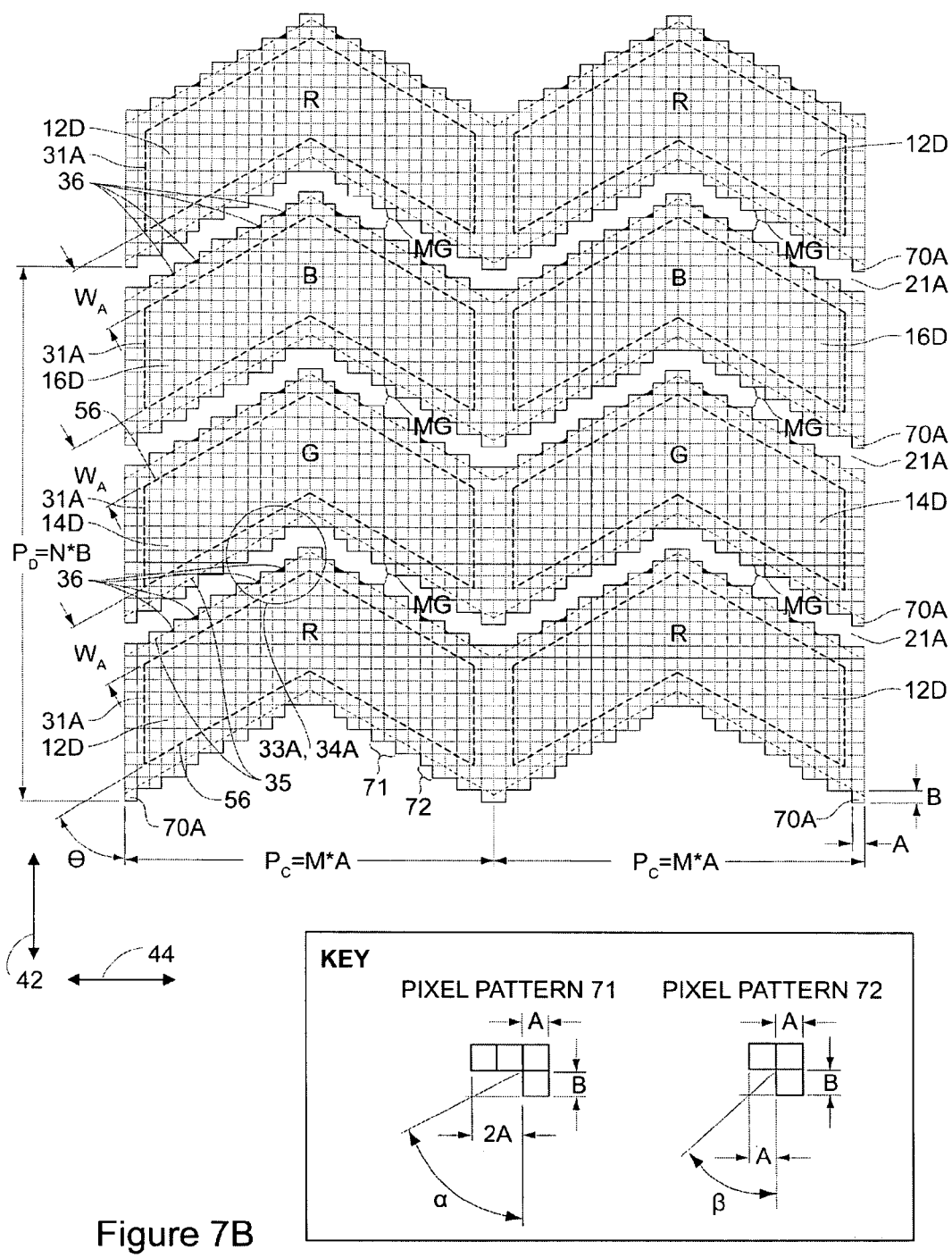
FIG. 7B shows a view of a patterns of features that include the feature portions of FIG. 7A.

FIG. 7B shows a larger view of the various patterns of features corresponding to feature portions 33A and 34A and matrix line 21A of FIG. 7A. In this case, features portions 33A and 34B are part of chevron-shaped features 12D and 14D. Various matrix line edges 56 are skewed relative to a scanning direction by angle θ, which in this case is equal to 60 degrees. FIG. 7B shows a pattern of red (R) features 12D arranged with pitch $P_C$ along the first direction and pitch $P_D$ along the second direction. It is to be understood that green (G) features 14D and blue (B) feature portions 16D are also arranged with a pitch $P_D$ along the second direction with others of the features comprising the same color (not shown). In this case $P_C$ is equal in size to an integer multiple M of first pixel size A and $P_D$ is equal in size to an integer multiple N of second pixel size B.

FIG. 7B shows how undesired non-overlapped regions 36 are created by various arrangements of pixels 70A that form each of the features 12D, 14D and 16D. The pixels 70A are arranged in various stair-case arrangements. In this case, the edges of each of the features 12D, 14D and 16D have been formed with several pixel patterns 71 and pixel patterns 72. Each pixel pattern 71 includes a stair-case arrangement of pixels 70A whose pixel edges form a rise equal to 1*B for run equal to 2*A, while each pixel pattern 72 includes a stair-case arrangement of pixels 70A whose edges form a rise equal to 1*B for a run equal to 1*A. In this example, "rise" refers to a direction that is parallel to main-scan axis 42, whereas "run" refers to a direction that is parallel to sub-scan axis 44. Pixel patterns 71 and 72 are identified in the KEY of FIG. 7B.

To properly position each of the features 12D, 14D and 16D with corresponding matrix cells 31A, pixels sizes A and B have been selected to form each of the corresponding patterns of features 12D, 14D and 16D with the desired pitches $P_C$ and $P_D$ which correspond to pitches of various matrix cells 31A. Pixel patterns 71 and 72 have been arranged to align the edges of the features 12D, 14D and 16D as closely as possible to the orientation of matrix lines 21A. That is, pixel patterns 71 and 72 are arranged along a direction that attempts to match the direction of the skewed matrix lines. However, the sizes of each pixel 70A which have been selected on the basis of "matching pitch" have resulted in alignment that does not exactly match the various required skewed orientations of matrix lines 21A. The steps created by the pixels stair-case arrangement of each of pixel patterns 71 and 72 can be characterized by various pitch angles. For example, the pixels in pixel pattern 71 are arranged to produce a pitch angle α, and the pixels in pattern 72 are arranged to produce a pitch angle β. Neither pitch angle α nor pitch angle β is equal to a required skew angle equal to θ.

Pixel patterns 71 and 72 have been arranged to attempt to maintain the required minimum overlap and minimum gap criteria as closely as possible. As shown in FIG. 7B, pixel patterns corresponding to the edges of feature portion 33A and 34A are nested with respect to each other over matrix line 21A to establish a gap between the feature portions that is not smaller than that defined by the MG requirements. However, since pixel patterns 71 and 72 have been arranged to produce the various feature edges with inclinations that only approximate the corresponding skewed inclinations of matrix line 21A, the minimum required overlap (MRO) criteria has not been fully maintained. The staircase edges of feature portion 34A that overlaps matrix line 21A maintain an overlap that substantially equals or is greater than the required MRO value defined by the corresponding MRO boundary lines 35. The stair-case edges of feature portion 33A that overlap matrix line 21A however do not completely maintain an overlap that is substantially equal or greater than the required MRO value defined by its corresponding MRO boundary lines 35. Specifically, regions 36 show various regions of matrix line 21A that are not overlapped as per the minimum requirements defined by the MRO value. In the case of color filters, portion of a matrix line which are not properly overlapped by the surrounding color features can lead to visual artifacts which can detract from the quality of the display.

It will now become apparent to those skilled in the art, that the illustrated misalignment arises from the size of pixels 70A that are used to form the various pixel patterns. Although the sizes of pixels 70A allow patterns of features 12D, 14D and 16D to be formed with their desired pitches $P_C$ and $P_D$, the edges of the features cannot be formed such that they are oriented with a desired skew angle equal to θ.

Figure 8:
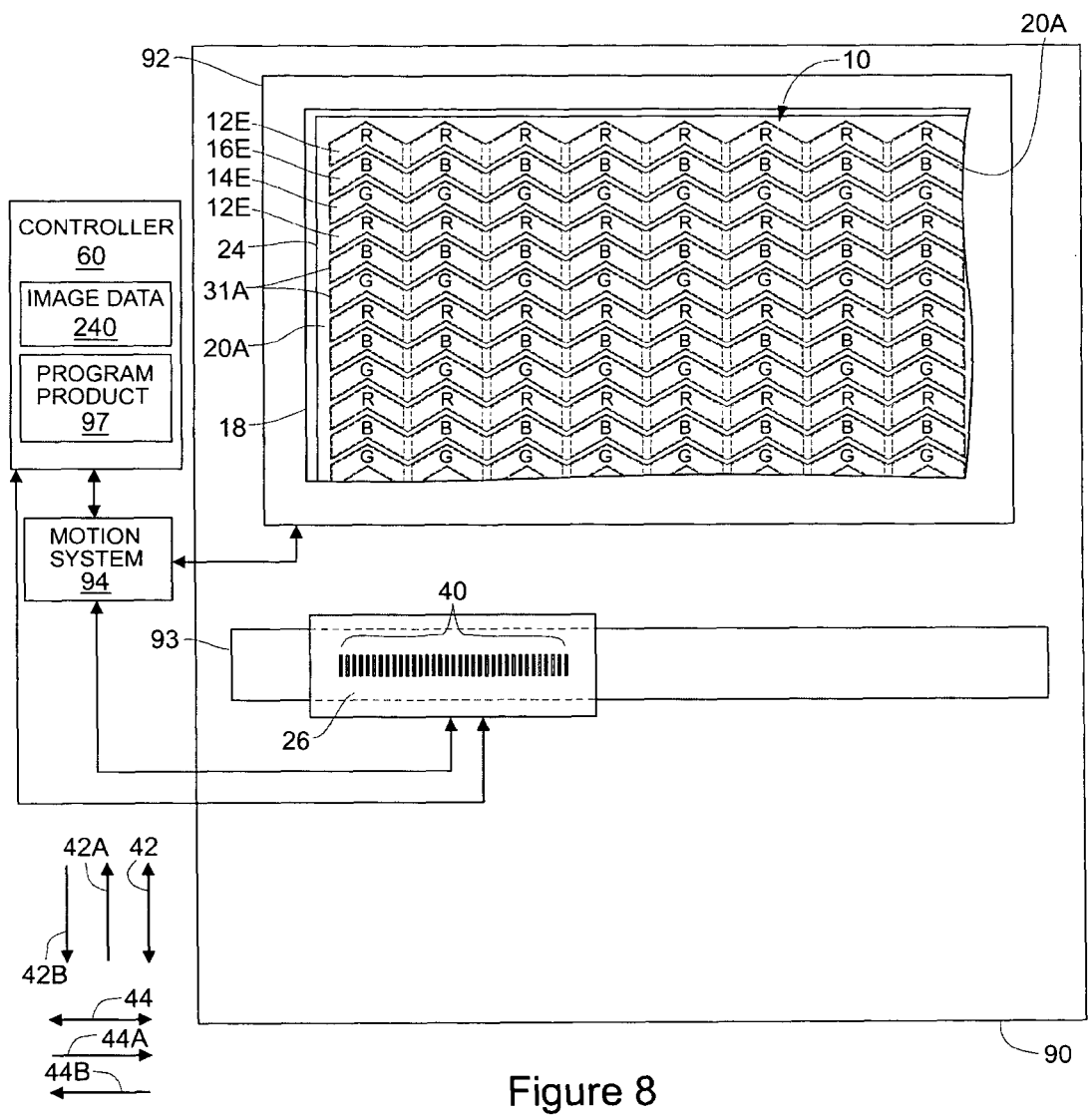
FIG. 8 schematically shows an apparatus 90 used in an example embodiment of the invention.

FIG. 8 schematically shows an apparatus 90 used in an example embodiment of the invention. Apparatus 90 is operable for forming images on receiver element 18. In this example embodiment of the invention, images are formed on receiver element 18 by operating imaging head 26 to direct radiation beams while scanning over receiver element 18. Apparatus 90 includes carrier 92 which is operable for conveying receiver element 18 along a path aligned with main-scan axis 42. Carrier 92 can move in a reciprocating fashion. In this example embodiment of the invention, carrier is movable in a forward direction 42A and a reverse direction 42B. Imaging head 26 is movably arranged on a support 93 that straddles carrier 92. Imaging head 26 is controlled to move along paths aligned with sub-scan axis 44. In this example embodiment of the invention imaging head 26 can be controlled to move along support 93. Imaging head 26 is movable in away direction 44A and in home direction 44B. Apparatus 90 forms images by bi-directionally scanning receiver element 18.

In this example embodiment of the invention, a laser induced thermal transfer process is employed. Imaging head 26 is controlled to scan the media with a plurality of radiation beams to cause an image forming material (not shown) to be transferred from donor element 24 to receiver element 18. Imaging electronics (not shown) control the imaging channels 40 to regulate the emission of the radiation beams. Motion system 94 (which can include one or more motion systems) includes any suitable drives, transmission members, and/or guide members to cause the motion of carrier 92. In this example embodiment of the invention, motion system 94 controls the motion of imaging head 26 and controls the motion of carrier 92. Those skilled in the related art will realize that separate motion systems can also be used to operate different systems within apparatus 90.

Controller 60, which can include one or more controllers, is used to control one or more systems of apparatus 90 including, but not limited to, motion system 94 used by carrier 92 and imaging head 26. Controller 60 can also control media handling mechanisms that can initiate the loading and/or unloading of receiver element 18 and donor element 24. Controller 60 can also provide image data 240 to imaging head 26 and control imaging head 26 to emit radiation beams in accordance with this data. Various systems can be controlled using various control signals and/or by implementing various methods. Controller 60 can be configured to execute suitable software and can include one or more data processors, together with suitable hardware, including by way of non-limiting example: accessible memory, logic circuitry, drivers, amplifiers, A/D and D/A converters, input/output ports and the like. Controller 60 can comprise, without limitation, a microprocessor, a computer-on-a-chip, the CPU of a computer or any other suitable microcontroller.

FIG. 8 schematically shows the formation of color filter 10 that includes patterns of red (R) color features 12E, green (G) color features 14E and blue (B) color features 16E which are formed in alignment with matrix 20A as per an example embodiment of the invention. Matrix 20A corresponds to the same matrix shown in FIG. 7B.

Figure 9:
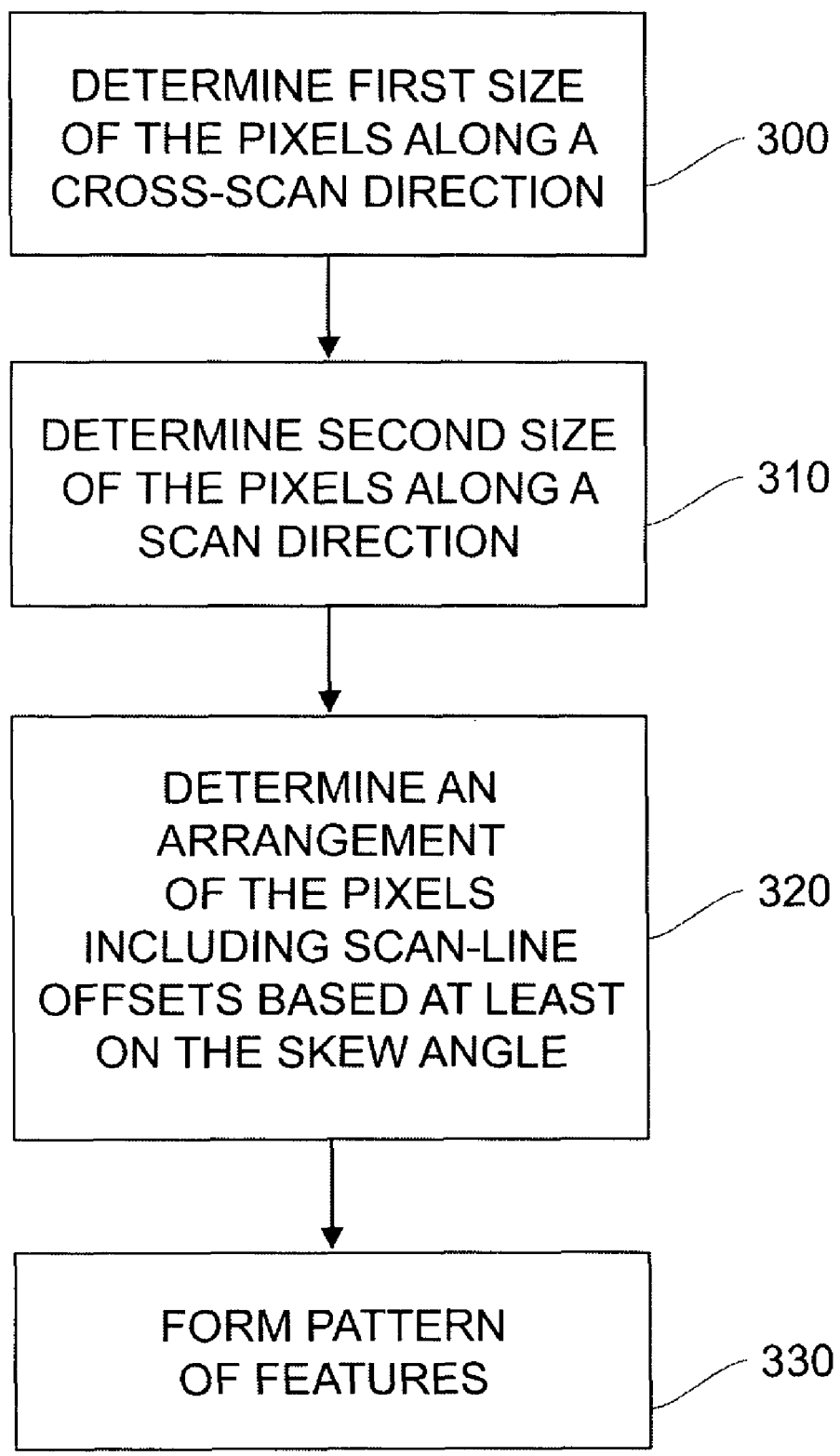
FIG. 9 shows a flow chart for imaging patterns of features with skewed edges as per an example embodiment of the invention.
Figure 10A:
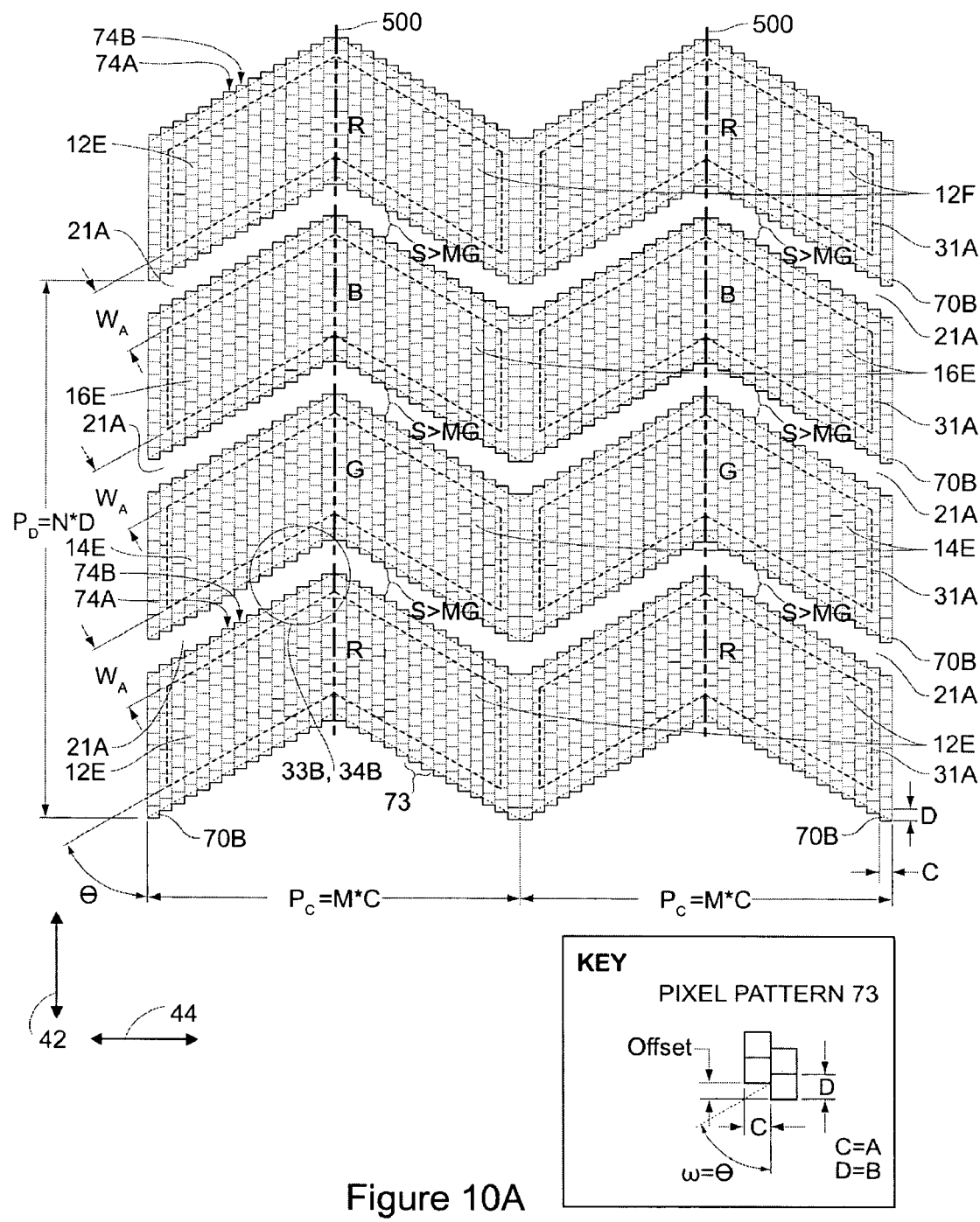
FIG. 10A shows patterns of features formed in alignment with a matrix as per an example embodiment of the invention.

FIG. 9 shows a flow chart for imaging one or more patterns of features by controlling an imaging head to emit radiation beams while scanning along a scan direction as per an example embodiment of the invention. Each of the one or more patterns of features includes a feature that includes one or more edge portions that are skewed relative to the scan direction. In this example embodiment, each of the corresponding patterns of features 12E, 14E and 16E (as shown in FIG. 10A) are formed with patterns of pixels 70B. It is desired that the pitches of the formed color features 12E, 14E and 16E substantially equal the pitches of corresponding matrix cells 31A. It is also desired that each of the color features 12E, 14E and 16E be formed such that they are more accurately aligned with matrix lines 21A than the corresponding imaged feature color features 12D, 14D and 16D were in FIG. 7B. The following description of the FIG. 9 flow chart refers to apparatus 90 as schematically shown in FIG. 8, although it is understood that other apparatus are suitable for use with the illustrated process.

The process begins a step 300 where a first size C of a plurality of pixels 70B to be formed on receiver element 18 is determined. Each of the pixels is to be sized with the first size C along a cross-scan direction and a second size D along a scan direction. In this example embodiment, the cross-scan direction is substantially perpendicular to the scan direction. In this example embodiment, the cross-scan direction is parallel to sub-scan axis 44. The first size C corresponds to the resolution of the imaging head 26 in the cross-scan direction. In this example embodiment of the invention, the first size C is along an edge of a pixel. In other example embodiments of the invention, the first size can correspond to other dimensions of a pixel.

In step 310, the second size D of the pixels to be formed is determined based on various parameters. In this example embodiment, the second size D corresponds to the resolution of the imaging head 26 along the scan direction. In this example embodiment, the scan direction is parallel to main-scan axis 42. In this example embodiment of the invention, the second size is along an edge of a pixel In this example embodiment of the invention, the first size C and the second size D are determined to cause each of the patterns of color features 12E, 14E and 16E to be formed with their required pitches along a plurality of directions much like pixels 70A were sized to cause each of the patterns of color features 12D, 14D and 16D to be formed with their desired pitches in FIG. 7B. In this example embodiment, first pixel size C and second pixel size D of pixels 70B are equal in size to the corresponding first pixel size A and the second pixel size B of the pixels 70A shown in FIG. 7B. As shown in FIG. 10A, pitch $P_C$ of each of the patterns of features to be formed is equal to an integer number M of first size C and pitch $P_D$ of each of the patterns of features to be formed is equal to an integer number N of the second size D. In this example embodiment, each of the patterns of color features 12E, 14E and 16E are formed during different scans of the imaging head 26. In this example embodiment, each of the patterns of color features 12E, 14E and 16E are formed with the same pitches and are imaged with same sized pixels 70B. In other example embodiments of the invention, different patterns of features are imaged with different sized pixels. In some example embodiments of the invention, different patterns features can have different pitches along one or more directions.

In step 320, an arrangement is determined for the pixels 70B based at least on a required skew angle. Each of color features 12E, 14E and 16E comprises various edges that extend in various directions. Some of these directions will be skewed by various skew angles relative to a desired scan direction. In this illustrated embodiment, it is desired that each of the color features 12E, 14E and 16E be formed such that some of their edges extend along a direction that is skewed by a desired skew angle relative to the scan direction. In this example embodiment, the desired skew angle is equal to θ, which in this case represents the orientation of the matrix lines 21A. In this example embodiment of the invention, scan-lines of the pixels 70B are to be formed and offsets between various scan-lines of pixels 70B are determined based at least upon the amount of desired skew angle. In particular, in this example embodiment an offset between a first scan-line 74A of the pixels 70B and a second scan-line 74B of the pixels 70B is determined based at least on the skew angle and the first size C of the pixels 70B in the scan-lines. A scan-line of pixels is formed when an imaging channel 40 of imaging head 26 is controlled to selectively emit radiation beams while scanning along a scanning path. A series of pixels are formed along the scan-line, each of the pixels being formed by one of the radiation beams. Different imaging channels 40 are controlled to form corresponding scan-lines of pixels. In this example embodiment of the invention, offsets between scan-lines are created by timing delays in the activation of imaging channels 40 that are to be used to form the scan-lines. A delay in the activation of a given imaging channel 40 relative to the activation of another imaging channel 40 will cause the scan-line of pixels formed by the given imaging channel 40 to be offset along the scan direction from the scan-line of pixels formed by the other imaging channel 40. As shown in FIG. 10A, portions of each feature 12E are formed by scan-lines 74A and 74B during a scan. Portions of features 14E and 16E would be formed by other scan-lines during other scans.

FIG. 10A shows an example of scan-lines of pixels 70B which include determined first size C and determined second size D that are used to form color features 12E, 14E and 16E. Pixels 70B are arranged in pixel patterns 73 along various edge portions of each of the color features 12E, 14E and 16E. Again, in this example embodiment, features of different colors are formed during different scans, and therefore are formed by different scan-lines of pixels. The various scan-lines extend along a common scan direction and various edges of each of the color features 12E, 14E and 16E extend along directions that are skewed relative to the scan direction by a skew angle equal to θ.

Imaging channel timing delays are employed to form pixel patterns 73 into stair-case arrangements of pixels 70B. In this example embodiment of the invention the stair-case patterns 73 repeat along a direction that is skewed with respect to the scan direction by the desired skew angle (i.e. θ in this case).

Figure 10B:
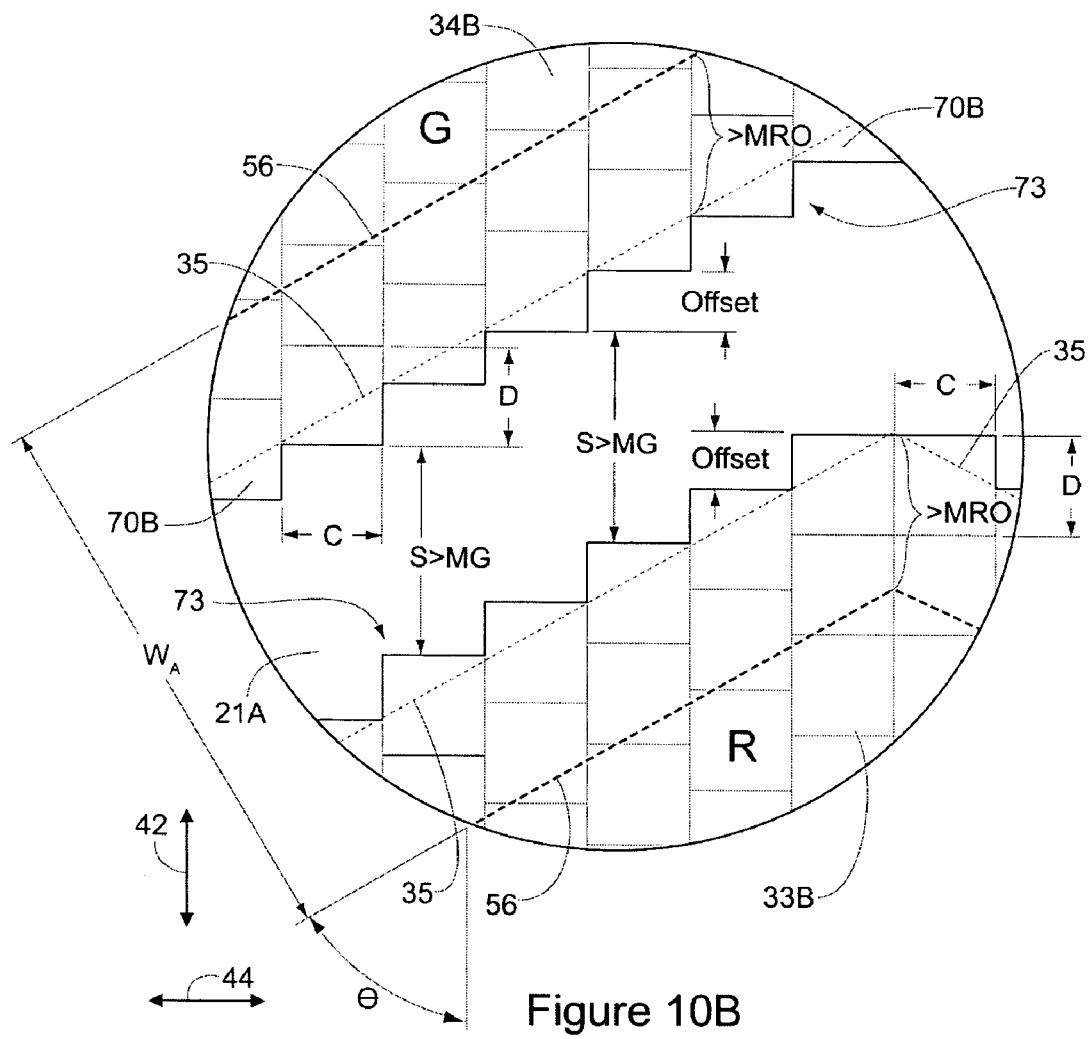
FIG. 10B shows an enlarged view of various portions of the features of FIG. 10A.

FIG. 10B shows a detailed view of the patterns 73 of pixels 70B. In particular, FIG. 10B shows a detailed view of feature portions 33B and 34B. FIG. 10B shows that a consistent minimum required overlap (MRO) between skewed matrix line 21A and the each of the feature portions 33B and 34B is maintained. Advantageously, non-overlapped regions 36 are not present. FIG. 10B also shows that feature portions 33B and 34B are separated from one another over matrix line 21A by distance S which is greater than the minimum gap MG requirements while maintaining minimum overlap requirements.

In this example embodiment of the invention, offsets between the various scan-lines of pixels 70B are determined by the following relationship:

$$\text{Offset} = (T*X)/\text{Tan}(\theta), \text{ where:} \quad (6)$$

Offset is the offset between scan-lines along the scan direction;
X is the first size;
θ is an angle corresponding to the skew angle as referenced from the scan direction; and
T is an integer greater than, or equal to 1.

In this example embodiment, θ represents an orientation of the matrix lines 21A, but is not limited as such and can represent other desired orientations with respect to the scan direction of a feature edge.

In this example embodiment of the invention, T=1, θ=60 degrees and X=C. The first scan-line and the second scan-line can be adjacent scan lines. In this example embodiment, steps are created in the stair-case arrangements of each pixel pattern 73 such that each of the steps is less that the second size D. In some example embodiments, the steps can be greater than second size D. As shown in the KEY of FIG. 10A, the steps created by the stair-case arrangement of each of pixel patterns 73 can characterized by a pitch angle ω that is equal to the skew angle (i.e. θ in this case). Each of the patterns of features 12E, 14E and 16E are thus formed with their required pitches and alignment issues associated with the skewed features edges are additionally resolved. The non-overlapped regions 36 shown in FIGS. 7A and 7B are not present and a color filter with improved visual quality results. Additionally, the width of matrix line 21A need not be increased as may be required when conventional imaging techniques are employed.

In this example embodiment of the invention, the imaging was controlled to form the various patterns of color features 12E, 14E and 16E from color stripes that are oriented to extend along a cross-scan direction. The color stripes bend from side to side as they extend along the cross-scan direction. In this example embodiment of the invention, the patterns of features 12E, 14E and 16E are oriented so that the offsets between scan-lines create pixel patterns 73 that are used to correctly form a plurality of edges of each of the features in each pattern. Imaging channel timing delays do not typically result in local changes in the pixels of a given scan-line but globally shift the position of the entire scan-line of pixels. In some cases, while scan-line offsets can cause a first edge portion of a feature to be formed with a desired orientation, these same offsets can cause a second edge portion not to be formed with a desired orientation. This effect can occur when the first and second edge portions have different orientations relative to the scan direction.

In this example embodiment, the orientation of the patterns of features 12E, 14E and 16E has been selected to cause each of the features 12E, 14E and 16E to have an axis of symmetry 500 that is substantially parallel to the scan direction. In this example embodiment, each of the features 12E, 14E and 16E is oriented such that each feature has at least two edge portions that are skewed relative to the scan direction and are parallel and offset from one another. In this example embodiment, the parallel edge portions are offset from one another along the scan direction. Each of the features 12E, 14E and 16E are oriented such that these parallel edge portions intersect a plurality of associated scan-lines of pixels 70B that are offset from each other along the scan direction. For example, scan-lines 74A and 74B are offset scan-lines that intersect various edge portions of features 12E that are parallel and offset from one another along the scan direction. In this illustrated embodiment, offset scan-lines 74A and 74B intersect these parallel and offset edge portions without intersecting other edge portions of features 12E that can extend along other directions that are different than the directions that the intersected edge portions extend along. Accordingly, the determine offsets between each of the various scan-lines of pixels 70B allow each of the parallel edge portions to be formed with their desired orientation. A plurality of features 12E are formed with an orientation in which various edges of each feature 12E are skewed by the same skew angle relative to the scan direction. Additionally and advantageously, since pixels 70B comprise first and second sizes that are determined on the basis of "pitch", each of the patterns of features 12E can be formed with their desired pitches along the first and second directions. The same holds for the patterns of features 14E and 16E.

In step 330, each of the patterns of features 12E, 14E and 16E are formed by controlling imaging channels 40 of imaging head 26 to emit radiation beams while scanning across receiver element 18. Scan-lines of pixels 70B are formed with sizes that allow each of the patterns of the features to be formed with their required pitches. Pixels 70B can be each sized in accordance with the techniques taught herein, for example. Various scan-lines of pixels 70B are offset from other of the scan-lines in accordance with the skew of various edge portions of each of the features 12E, 14E and 16E.

Figure 7C:
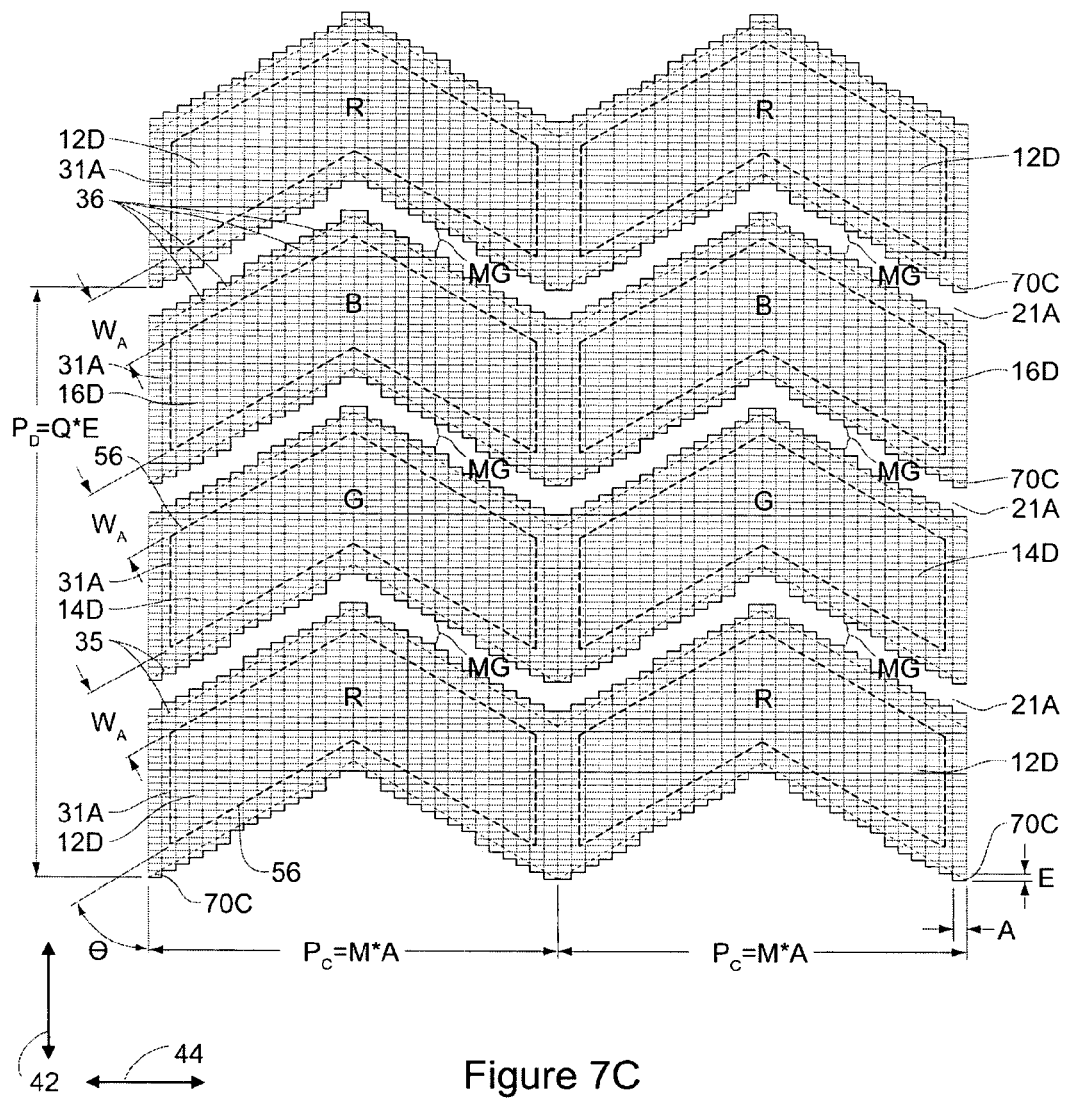
FIG. 7C shows the patterns of features of FIG. 7B as formed with pixels having a higher scan resolution.

FIG. 7C shows a variant imaging of the pattern of features 12D, 14D and 16D shown in FIG. 7B. FIG. 7C attempts to improve the alignment between the imaged features 12D, 14D and 16D by using smaller pixels than those used in FIG. 7B. Like FIG. 7B, each of the features is formed with pixels 70C which have a first size A along a cross-scan direction that is sized in accordance with the pitch of the features along the first direction. Pixels 70C also have a second size E along the scan direction that is determined on the pitch of the features along the second direction. However, in this case, the second size E corresponds to a high resolution (i.e. smaller pixel size). The pitch of the features along the second direction is again equal to an integer multiple Q of pixel size E.

The higher resolutions along the scan direction have created arrangements of pixels 70C which have substantially met the minimum overlap (MRO) requirements. FIG. 7C accordingly shows an absence of the undesired non-overlapped region shown in FIG. 7B. However, as shown in FIG. 7C adjacent features that overlap a given matrix line 21A are still separated from one another by a spacing equal to the minimum gap (MG) requirements. FIG. 7C indicates that the opportunity to use thinner matrix lines is still not provided even with the use of higher imaging resolutions.

Figure 10C:
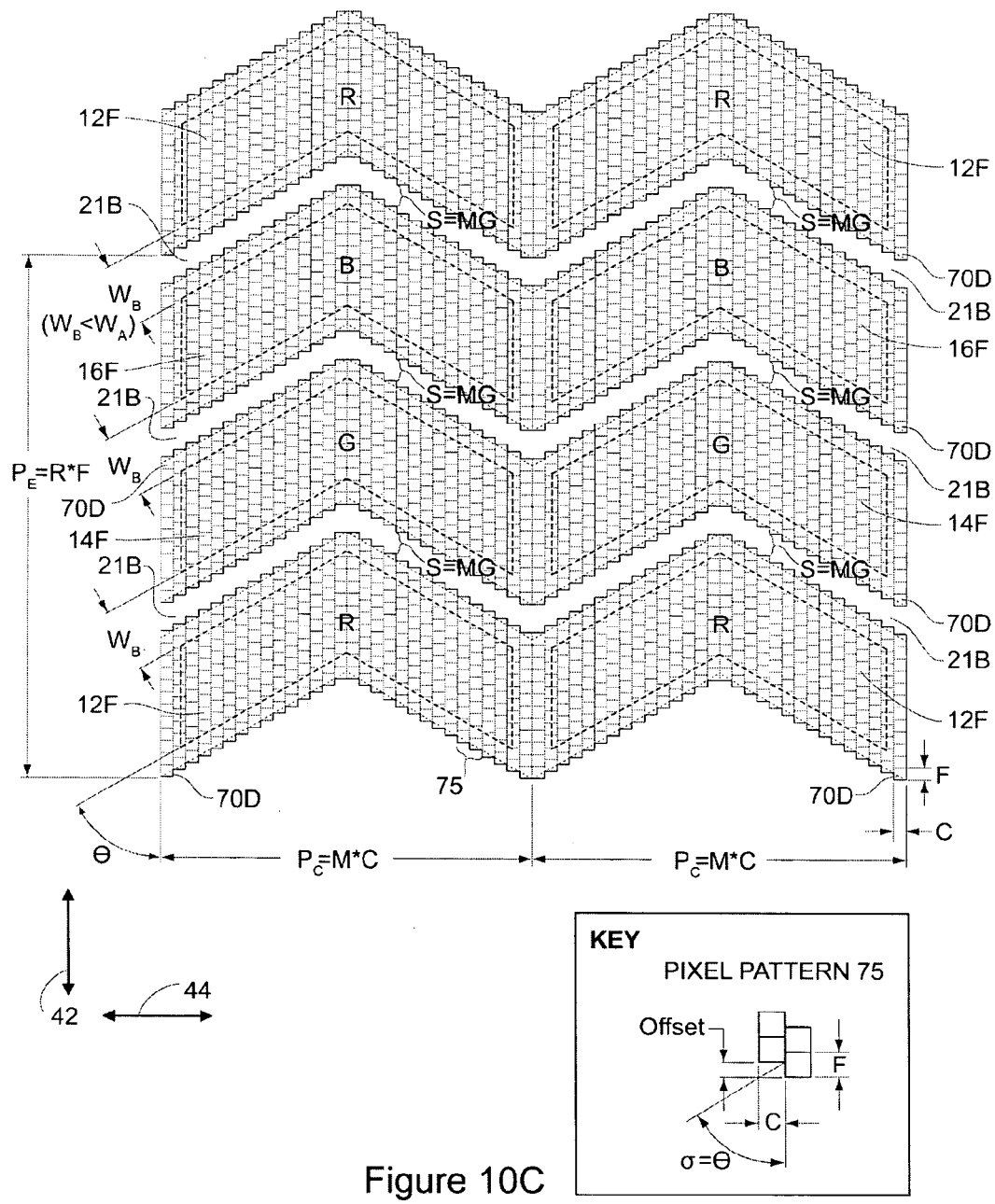
FIG. 10C shows patterns of features formed in alignment with a matrix as per another example embodiment of the invention, wherein the matrix comprises thinner matrix lines than the matrix of FIG. 7A.

FIGS. 10A and 10B show that the distance S along the scan direction between each of the features 12E, 14E and 16E is greater than the minimum gap spacing MG shown in FIG. 7B. Advantageously, scan-line offsets combined with pixels 70C that are sized in accordance with the required pitches of the features can provide the opportunity to reduce the spacing between the adjacent features and thereby accommodate thinner matrix line widths which are desired in the display industry. FIG. 10C shows the features 12F, 14F and 16F formed as per an example embodiment of the invention, such that the spacing S between adjacent features is equal to minimum gap MG, thereby allowing thinner matrix lines 21B to be used in the color filter (i.e. matrix lines 21B have a width $W_B$ that is thinner than the width $W_A$ of matrix lines 21A). Each of the features 12F, 14F and 16F have been formed with patterns of pixels 70D. Each of the pixels 70D has a first size along a cross-scan direction that is equal to C. The first size of the pixels in this embodiment is identical to the first size of the pixels 70B shown in FIG. 10A since both these first sizes were determined based on an identical feature pitch along the first direction. Each of the pixels 70D has a second size along the scan direction that is equal to F. The second size F is determined based on the desired pitch $P_E$ of each of the respective patterns of features 12F, 14F and 16F. Since pitch $P_E$ is different than the pitch $P_D$ of the example embodiment shown in FIG. 10A (i.e. the features are more closely spaced along the second direction due to thinner matrix lines 21B), second size F is different from second size D. In this example embodiment, pitch $P_E$ is equal to an integer multiple R of second size F. As in other similar example embodiments of the invention, offsets between the scan-lines of pixels 70D are formed based on the desired skew angles of various edges of each of the features 12F, 14F and 16F and the first size C. As shown in the KEY of FIG. 10C, the determined offsets produce pixel patterns 75 with pitch angles σ that are equal to the desired skew angles (i.e. θ in this case). The offsets between the scan-lines are determined to maintain the desired minimum overlap MRO requirements and gap sizes S that are substantially equal to the minimum gap MG requirements thereby allowing for the reduced matrix line widths. Additionally, undesired non-overlapped regions are not present.

FIG. 10C shows that thinner matrix line widths can be advantageously accommodated by example embodiments of the invention. It further becomes evident that sizing pixels on the basis of the various pitches of the patterns of features and offsetting scan-lines of the pixels as per example embodiments of the invention can provide a better alignment between the color features and a color filter matrix. Both of these effects resulting in a color filter with higher visual qualities. Pixels 70D additionally and advantageously comprises larger sizes than the higher resolution pixels 70C shown in FIG. 7C which were not offset as per example embodiments of the invention. Coarser resolutions can be used to enhance imaging productivity. For example, the size of an image pixel along the scan direction can depend on the scanning speed and the imaging channel switching frequency (i.e. the frequency which defines the amount of time a radiation spot is scanned across the media). The switching frequencies typically have practical upper limits and at these limits the size of the pixel along the scan direction will be defined by the scanning speed. Therefore at these limits, higher resolutions (i.e. smaller pixel sizes along the scan direction) can require slower scanning speeds since a smaller scanning distance is required during the time that the radiation spot is allowed to be scanned across the media to form a smaller pixel size along the scan direction. Lower resolutions (i.e. larger pixel sizes along the scan direction) advantageously allow for faster scanning speeds since a larger scanning distance is required during the time that the radiation spot is scanned across the media to form a larger pixel size along the scan direction. Imaging head 26 can comprise a multi-channel imaging head having individually-addressable imaging channels, each channel capable of producing a radiation beam operable form forming an image pixel. Imaging head 26 can include various arrangements of imaging channels 40 including one-dimensional or two-dimensional arrays of imaging channels 40. Any suitable mechanism may be used to generate radiation beams. The radiation beams may be arranged in any suitable way.

Some embodiments of the invention employ infrared lasers. Infrared diode laser arrays employing 150 μm emitters with total power output of around 50 W at a wavelength of 830 nm have been used by the present inventors in laser induced thermal transfer processes. Alternative lasers including visible light lasers may also be used in practicing the invention. The choice of laser source employed may be motivated by the properties of the media to be imaged.

Various example embodiments of the invention have been described in terms of a laser induced thermal transfer processes in which an image forming material is transferred to a receiver element. Other example embodiments of the invention can be employed with other imaging methods and media. Images can be formed on media by different methods without departing from the scope of the present invention. For example, media can include an image modifiable surface, wherein a property or characteristic of the modifiable surface is changed when irradiated by a radiation beam to form an image. A radiation beam can be used to ablate a surface of media to form an image. Those skilled in the art will realize that different imaging methods can be readily employed.

A program product 97 can be used by controller 60 to perform various functions required by apparatus 90. In one example embodiment of the invention, one such function can include setting a first pixel size along a cross-scan direction as a function of a desired pitch along a first direction of a pattern of features to be formed. Another such function can include setting a second pixel size along a scan direction as a function of a desired pitch along a second direction of a pattern of features to be formed, wherein the second direction intersects the first direction. Yet another such function can include offsetting scan-lines of the pixels from one another along the scan direction based on a desired skew angle of an edge of a feature to be imaged and the first size. Program product 97 can be used to configure controller 60 to determine at least one size of a plurality of pixels to be formed on the media, such that each of the pixels has a first size along a cross-scan direction and a second size along a scan direction. The second size can be different than the first size. The first size, the second size and the amount of offset between various scan-lines can be determined in accordance with the program instructions of program product 97. In the alternative, or additionally, controller 60 may permit manual assignment or adjustment of the pixel sizes and scan-line offsets under the guidance of an operator communicating with controller 60 through an appropriate user interface. Determination of the pixel sizes and scan-line offsets can be made on the basis of suitable algorithms and/or data inputted to controller 60, or programmed within program product 97. The pixel size and scan-line offset parameters can be determined in advance of imaging or may be determined "on the fly" as imaging progresses.

Without limitation, program product 97 may comprise any medium which carries a set of computer-readable signals comprising instructions which, when executed by a computer processor, cause the computer processor to execute a method as described herein. The program product 97 may be in any of a wide variety of forms. Program product 97 can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

Patterns of features have been described in terms of patterns of color features in a display. In some example embodiments of the invention, the features can be part of an LCD display. In other example embodiments of the inventions, the features can be part of an organic light-emitting diode (OLED) display. OLED displays can include different configurations. For example, in a fashion similar to LCD display, different color features can be formed into a color filter used in conjunction with a white OLED source. Alternatively, different color illumination sources in the display can be formed with different OLED materials with various embodiments of the invention. In these embodiments, the OLED based illumination sources themselves control the emission of colored light without necessarily requiring a passive color filter. OLED materials can be transferred to suitable media. OLED materials can be transferred to a receiver element with laser-induced thermal transfer techniques.

Various example embodiments of the invention have been described in terms of imaging chevron-shaped features. The invention however is not limited to imaging chevron shaped features but can be used to image various features that include other shapes that have edges that are skewed relative to a desired scanning direction. The invention can be used to image island features also.

While the invention has been described using as examples applications in display and electronic device fabrication, the methods described herein are directly applicable to other applications including those used in biomedical imaging for lab-on-a-chip (LOC) fabrication. LOC devices may include various patterns of features. The invention can have application to other technologies, such as medical, printing and electronic fabrication technologies.

It is to be understood that the exemplary embodiments are merely illustrative of the present invention and that many variations of the above-described embodiments can be devised by one skilled in the art without departing from the scope of the invention.

What is claimed is:

1. A method for forming an image of a pattern of features on media with radiation beams emitted by an imaging head while scanning over the media along a scan direction, wherein the features in the pattern are regularly arranged along a first direction and along a second direction that intersects the first direction, and the pattern includes a feature with a first edge portion that extends along a direction that is skewed by a skew angle relative to the scan direction, the method comprising:
   determining a pitch of the features along the first direction;
   determining a first size of a first pixel to be formed on the media based at least on the pitch of the features along the first direction, wherein the first size is along a direction that intersects the scan direction;
   determining a pitch of the features along the second direction;

determining a second size of a second pixel to be formed on the media based at least on the pitch of the features along the second direction; wherein the second size is along the scan direction;

determining an offset along the scan direction between a second scan-line of pixels to be formed on the media and a first scan-line of pixels to be formed on the media, the offset being determined based at least on the skew angle and the first size;

controlling the imaging head to emit the radiation beams to form the image on the media while scanning along the scan direction;

controlling the imaging head to form the first pixel comprising the determined first size and the second pixel comprising the determined second size while scanning over the media; and controlling the imaging head to form the first scan-line of pixels and the second scan-line of pixels while scanning over the media, wherein the second scan-line is offset from the first scan-line by the determined offset.

2. A method according to claim 1, wherein the pitch of the features along the first direction is equal to an integer multiple of the first size.

3. A method according to claim 2, wherein the pitch of the features along the second direction is equal to an integer multiple of the second size.

4. A method according to claim 1, wherein the first scan-line of pixels comprises the first pixel and the second scan-line of pixels comprises the second pixel.

5. A method according to claim 1, wherein each of the first scan-line of pixels and the second scan-line of pixels comprise the same sized pixels.

6. A method according to claim 1, wherein the first scan-line of pixels is offset from the second scan-line of pixels along the scan direction by an amount that is smaller than the second size.

7. A method according to claim 1, wherein the first scan-line of pixels is offset from the second line of pixels along the scan direction by an amount that is larger than the second size.

8. A method according to claim 1, comprising determining the offset along the scan direction based at least on the relationship:

Offset=$(T*X)/\mathrm{Tan}(\theta)$, wherein:

Offset is the offset along the scan direction;
X is the first size;
T is an integer greater than or equal to 1; and
$\theta$ is an angle corresponding to the skew angle.

9. A method according to claim 1, wherein the feature comprises a second edge portion that extends along a direction that is parallel to the direction that the first edge portion extends along.

10. A method according to claim 9, wherein the second edge portion and the first edge portion are offset from one another.

11. A method according to claim 9, wherein the second edge portion and the first edge portion are offset from one another along the scan direction.

12. A method according to claim 1, wherein each feature in the pattern comprises an edge portion that extends along a direction that is parallel to the direction that the first edge portion extends along, and wherein each of the edge portions are regularly arranged along the scan direction.

13. A method according to claim 1, wherein each feature in the pattern comprises a set of edge portions, wherein each of the edge portions in each set extends along a direction that is parallel to the direction that the first edge portion extends along, and each edge portion in each set is offset along the scan direction from other edge portions in the set.

14. A method according to claim 1, wherein the feature repeats along the first direction and along the second direction.

15. A method according to claim 1, wherein the feature comprises a chevron shape.

16. A method according to claim 1, wherein the feature comprises a shape with an axis of symmetry that extends along a direction that is parallel to the scan direction.

17. A method according to claim 16, wherein the feature comprises a chevron shape.

18. A method according to claim 1, wherein the second direction is parallel to the scan direction.

19. A method according to claim 1, comprising offsetting the second scan-line from the first scan-line with the determined offset by delaying the activation of an imaging channel of the imaging head.

20. A method according to claim 1, comprising controlling the duration of time with which a radiation beam is emitted to form a pixel on the media with a size along the scan direction equal to the second size.

21. A method according to claim 1, comprising controlling the imaging head to emit a radiation beam to form a radiation spot on the media, the method comprising controlling the duration of time in which the radiation spot is scanned across the media to form a pixel on the media with a size along the scan direction equal to the second size.

22. A method according to claim 1, wherein the imaging head comprises a light valve, the method comprising varying the length of time during which a channel of the light valve is turned on and off to form a pixel with a size along the scan direction equal to the second size.

23. A method according to claim 1, comprising controlling the imaging head to emit a radiation beam to form a radiation spot on the media, the method comprising positioning the radiation spot at an angle about an axis that intersects a surface of the media over which the radiation beam is scanned to form a pixel on the media with a cross-scan size that is equal to the first size.

24. A method according to claim 1, comprising rotating the imaging head to form a pixel on the media with a cross-scan size equal to the first size.

25. A method according to claim 1, comprising controlling the imaging head to emit a radiation beam to form a radiation spot on the media, the method comprising magnifying or de-magnifying the radiation spot to form a pixel on the media with a cross-scan size equal to the first size.

26. A method according to claim 1, wherein the imaging head is controllable to adjust a size of a pixel along the scan direction differently from a size of the pixel along the direction that intersects the scan direction.

27. A method according to claim 1, comprising forming the image on the media with a thermal transfer process.

28. A method according to claim 1, wherein the pattern comprises a plurality of different colored features and the features of each color are imaged separately.

29. A method according to claim 1, wherein the pattern comprises a pattern of color filter features.

30. A method according to claim 1, wherein the second size corresponds to a dimension of an edge of the second pixel and the first size corresponds to a dimension of an edge of the first pixel.

31. A program product carrying a set of computer-readable signals comprising instructions which, when executed by a controller, cause the controller to:

control an imaging head to emit radiation beams to form an image of a pattern of features while scanning over media along a scan direction, wherein the features in the pattern are regularly arranged along a first direction and along a second direction that intersects the first direction, and includes a feature with a first edge portion that extends along a direction that is skewed by a skew angle relative to the scan direction;

determine a pitch of the features along the first direction;

determine a first size of a first pixel to be formed on the media based at least on the pitch of the features along the first direction, wherein the first size is along a direction that intersects the scan direction;

determine a pitch of the features along the second direction;

determine a second size of a second pixel to be formed on the media based at least on the pitch of the features along the second direction; wherein the second size is along the scan direction;

determine an offset along the scan direction between a second scan-line of pixels to be formed on the media and a first scan-line of pixels to be formed on the media, the offset being determined based at least on the skew angle and the first size;

control the imaging head to form the first pixel and the second pixel on the media, and control the imaging head to form the first scan-line of pixels and the second scan-line of pixels while scanning over the media, wherein the second scan-line of pixels is offset from the first scan-line of pixels by the determined offset.

32. A method for forming an image on media with radiation beams emitted by an imaging head while scanning over the media along a scan direction, wherein the image comprises a plurality of features, the method comprising:

controlling the imaging head to emit the radiation beams to form the plurality of features on the media with an orientation in which a plurality of edges of each feature are skewed by a skew angle relative to the scan direction and each of the plurality of edges are parallel to one another and offset from one another along the scan direction controlling the imaging head to form a first scan-line of pixels while scanning over the media; and controlling the imaging head to form a second scan-line of pixels while scanning over the media, wherein the second scan-line is offset along the scan direction from the first scan-line by an offset distance determined based at least on the skew angle, and each of the first scan-line of pixels and the second scan-line of pixels intersects each of the plurality of edges of each feature while not intersecting other edges of each feature.

33. A method according to claim 32, wherein the plurality of features comprises a pattern of the features and each of the features are regularly arranged along the scan direction and along a direction that intersects the scan direction.

34. A method according to claim 33, wherein each of the features repeats along the scan direction and along the direction that intersects the scan direction.

35. A method according to claim 32, wherein the pixels of the first scan-line of pixels comprise a first size along a cross-scan direction, the method further comprising determining the offset distance based at least on the first size.

36. A method according to claim 35, wherein the plurality of features comprises a pattern of the features and each of the features are regularly arranged along the cross scan direction, and wherein the pitch of the features along the cross scan direction is equal to an integer multiple of the first size.

37. A method according to claim 32, wherein the first scan-line of pixels and the second scan-line of pixels are adjacent to one another.

38. A method according to claim 32, wherein the other edges of each feature extend along directions that are different than the direction that each edge of the plurality of edges extends along.

* * * * *